United States Patent
Sodagar et al.

(10) Patent No.: US 10,295,746 B2
(45) Date of Patent: May 21, 2019

(54) WIDE SHOULDER, HIGH ORDER MODE FILTER FOR THICK-SILICON WAVEGUIDES

(71) Applicant: Skorpios Technologies, Inc., Albuquerque, NM (US)

(72) Inventors: Majid Sodagar, Albuquerque, NM (US); Murtaza Askari, Albuquerque, NM (US); Guoliang Li, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 16/115,104

(22) Filed: Aug. 28, 2018

(65) Prior Publication Data
US 2019/0094464 A1 Mar. 28, 2019

Related U.S. Application Data

(63) Continuation of application No. 15/588,128, filed on May 5, 2017, now Pat. No. 10,088,629, which is a
(Continued)

(51) Int. Cl.
*G02B 6/26* (2006.01)
*G02B 6/14* (2006.01)
(Continued)

(52) U.S. Cl.
CPC ............ *G02B 6/14* (2013.01); *G02B 5/20* (2013.01); *G02B 6/122* (2013.01); *G02B 6/1228* (2013.01);
(Continued)

(58) Field of Classification Search
CPC ........ G02B 6/14; G02B 6/122; G02B 6/1228; G02B 6/262; G02B 5/20;
(Continued)

(56) References Cited

U.S. PATENT DOCUMENTS 4,182,545 A 1/1980 Greer et al.
4,293,826 A 10/1981 Scifres et al.
(Continued)

FOREIGN PATENT DOCUMENTS

CN 101637007 A 1/2010
CN 106133999 A 11/2016
(Continued)

OTHER PUBLICATIONS

European Patent Application No. 12827040.2-1553, "Extended European Search Report", dated Apr. 9, 2015, 6 pages.
(Continued)

*Primary Examiner* — Thomas A Hollweg
*Assistant Examiner* — Guy G Anderson
(74) *Attorney, Agent, or Firm* — Kilpatrick Townsend & Stockton LLP

(57) ABSTRACT

An optical filter for attenuating higher-order modes in an optical waveguide includes a shoulder slab formed of a first material having a first index of refraction and disposed on a second material having a second index of refraction, the first index of refraction being higher than the second index of refraction. The shoulder slab defines a near end having a first width, an intermediate section, adjacent to the first end section, and a far end section, adjacent to the intermediate section and opposite the first end section along a direction of beam propagation. The optical filter also includes a waveguide ridge, formed of the first material and disposed atop the shoulder slab, that traverses the shoulder slab, and is configured to guide light of a fundamental mode along the direction of beam propagation from the near end section to the far end section.

19 Claims, 15 Drawing Sheets

Related U.S. Application Data continuation of application No. 15/262,937, filed on Sep. 12, 2016, now Pat. No. 9,664,855, which is a continuation-in-part of application No. 14/642,429, filed on Mar. 9, 2015, now Pat. No. 9,465,163.

(60) Provisional application No. 61/949,916, filed on Mar. 7, 2014, provisional application No. 62/292,645, filed on Feb. 8, 2016.

(51) Int. Cl.
| | | |
|---|---|---|
| *G02B 6/122* | (2006.01) | |
| *G02B 5/20* | (2006.01) | |
| *G02B 6/12* | (2006.01) | |
| *G02F 1/35* | (2006.01) | |
| *G02F 1/365* | (2006.01) | |

(52) U.S. Cl.
CPC .... *G02B 6/262* (2013.01); *G02B 2006/12035* (2013.01); *G02B 2006/12097* (2013.01); *G02B 2006/12109* (2013.01); *G02F 1/3501* (2013.01); *G02F 1/365* (2013.01); *G02F 2001/3509* (2013.01)

(58) Field of Classification Search
CPC ......... G02B 2006/12035; G02F 1/3501; G02F 1/365; G02F 2001/3509
See application file for complete search history.

(56) References Cited

U.S. PATENT DOCUMENTS

| | | | |
|---|---|---|---|
| 4,389,567 A | 6/1983 | Khoe et al. | |
| 4,799,749 A | 1/1989 | Borner et al. | |
| 4,886,538 A | 12/1989 | Mahapatra | |
| 4,932,032 A | 6/1990 | Koch et al. | |
| 5,190,883 A | 3/1993 | Menigaux et al. | |
| 5,319,667 A | 6/1994 | Duetting et al. | |
| 5,333,219 A | 7/1994 | Kuznetsov et al. | |
| 5,454,058 A | 9/1995 | Mace et al. | |
| 5,579,424 A | 11/1996 | Schneider | |
| 5,586,209 A | 12/1996 | Yuji et al. | |
| 5,633,512 A | 5/1997 | Okuda et al. | |
| 5,745,614 A | 4/1998 | Kersten et al. | |
| 5,818,989 A | 10/1998 | Nakamura | |
| 5,838,070 A | 11/1998 | Naruse et al. | |
| 5,858,814 A | 1/1999 | Goossen et al. | |
| 5,981,400 A | 11/1999 | Lo | |
| 5,987,046 A | 11/1999 | Kobayashi et al. | |
| 5,987,050 A | 11/1999 | Doerr et al. | |
| 6,041,071 A * | 3/2000 | Tayebati | G02F 1/035 372/20 |
| 6,101,210 A | 8/2000 | Bestwick et al. | |
| 6,118,978 A | 9/2000 | Ihmels et al. | |
| 6,192,058 B1 | 2/2001 | Abeles | |
| 6,229,792 B1 | 5/2001 | Anderson et al. | |
| 6,316,281 B1 | 11/2001 | Lee et al. | |
| 6,509,139 B1 | 1/2003 | Roberts et al. | |
| 6,571,039 B1 | 5/2003 | Al-hemyari et al. | |
| 6,690,857 B2 | 2/2004 | Zhao et al. | |
| 6,714,566 B1 | 3/2004 | Coldren et al. | |
| 6,728,279 B1 | 4/2004 | Sarlet et al. | |
| 6,768,855 B1 | 7/2004 | Bakke et al. | |
| 6,829,561 B2 | 12/2004 | Keller et al. | |
| 6,846,694 B2 | 1/2005 | Fukushima et al. | |
| 6,888,989 B1 | 5/2005 | Zhou et al. | |
| 6,931,178 B2 | 8/2005 | Saccomanno et al. | |
| 7,006,746 B2 | 2/2006 | Al-hemyari et al. | |
| 7,016,560 B2 | 3/2006 | Ticknor et al. | |
| 7,058,096 B2 | 6/2006 | Sarlet et al. | |
| 7,082,235 B2 | 7/2006 | Gunn et al. | |
| 7,120,336 B2 | 10/2006 | Blalock et al. | |
| 7,257,283 B1 | 8/2007 | Liu et al. | |
| 7,317,853 B2 | 1/2008 | Laurent-Lund et al. | |
| 7,323,353 B2 | 1/2008 | Blalock et al. | |
| 7,326,611 B2 | 2/2008 | Forbes | |
| 7,359,607 B2 | 4/2008 | Blalock et al. | |
| 7,392,247 B2 | 6/2008 | Chen et al. | |
| 7,464,147 B1 | 12/2008 | Fakhouri et al. | |
| 7,519,257 B2 | 4/2009 | Lipson et al. | |
| 7,531,395 B2 | 5/2009 | Blomiley et al. | |
| 7,539,373 B1 | 5/2009 | Logvin et al. | |
| 7,598,527 B2 | 10/2009 | Behfar et al. | |
| 7,633,988 B2 | 12/2009 | Fish et al. | |
| 7,701,985 B2 | 4/2010 | Webster et al. | |
| 7,720,341 B2 | 5/2010 | Blalock et al. | |
| 7,796,656 B2 | 9/2010 | Watson et al. | |
| 7,831,116 B2 | 11/2010 | Kim et al. | |
| 7,936,955 B2 | 5/2011 | Blalock et al. | |
| 7,939,934 B2 | 5/2011 | Haba et al. | |
| 7,972,875 B2 | 7/2011 | Rogers et al. | |
| 8,025,444 B2 | 9/2011 | Choi et al. | |
| 8,106,379 B2 | 1/2012 | Bowers | |
| 8,164,748 B1 * | 4/2012 | Flanders | G01J 3/108 356/300 |
| 8,170,383 B2 | 5/2012 | Tokushima et al. | |
| 8,195,020 B2 | 6/2012 | Blalock et al. | |
| 8,222,084 B2 | 7/2012 | Dallesasse | |
| 8,254,735 B2 | 8/2012 | Tsai et al. | |
| 8,271,205 B2 | 9/2012 | Reja et al. | |
| 8,290,014 B2 | 10/2012 | Junesand et al. | |
| 8,320,721 B2 | 11/2012 | Cevini | |
| 8,483,528 B2 | 7/2013 | Socci et al. | |
| 8,488,923 B2 | 7/2013 | Na et al. | |
| 8,542,763 B2 | 9/2013 | Perlman et al. | |
| 8,620,230 B2 | 12/2013 | Sanderovitz et al. | |
| 9,042,697 B2 | 5/2015 | Sandhu et al. | |
| 9,075,192 B2 | 7/2015 | Adams | |
| 9,097,846 B2 | 8/2015 | Mizrahi et al. | |
| 9,195,001 B2 * | 11/2015 | Hatori | G02B 6/1228 |
| 9,268,088 B2 | 2/2016 | Marchena et al. | |
| 9,348,099 B2 | 5/2016 | Ryckman et al. | |
| 9,354,396 B2 | 5/2016 | Baudot | |
| 9,429,693 B2 | 8/2016 | Takahashi | |
| 9,465,163 B2 | 10/2016 | Kumar | |
| 9,529,151 B2 | 12/2016 | Goi | |
| 9,664,855 B2 | 5/2017 | Sodagar et al. | |
| 10,088,629 B2 | 10/2018 | Sodagar et al. | |
| 2001/0010743 A1 | 8/2001 | Cayrefourcq et al. | |
| 2001/0026670 A1 | 10/2001 | Takizawa et al. | |
| 2002/0064337 A1 | 5/2002 | Behin et al. | |
| 2002/0097962 A1 | 7/2002 | Yoshimura et al. | |
| 2002/0197013 A1 | 12/2002 | Liu et al. | |
| 2003/0035446 A1 | 2/2003 | Griffel et al. | |
| 2003/0042494 A1 | 3/2003 | Worley | |
| 2003/0081877 A1 | 5/2003 | Nakata et al. | |
| 2003/0128724 A1 | 7/2003 | Morthier et al. | |
| 2003/0129660 A1 | 7/2003 | Zien et al. | |
| 2003/0210725 A1 * | 11/2003 | Prassas | H01S 3/063 372/50.1 |
| 2004/0017962 A1 | 1/2004 | Lee et al. | |
| 2004/0022223 A1 | 2/2004 | Billhartz et al. | |
| 2004/0037342 A1 | 2/2004 | Blauvelt et al. | |
| 2004/0066999 A1 | 4/2004 | Sakamoto et al. | |
| 2004/0077135 A1 | 4/2004 | Fan et al. | |
| 2004/0111397 A1 | 6/2004 | Chen et al. | |
| 2004/0114872 A1 | 6/2004 | Nagai | |
| 2004/0120675 A1 | 6/2004 | Skinner et al. | |
| 2004/0182914 A1 | 9/2004 | Venugopalan | |
| 2004/0228384 A1 | 11/2004 | Oh et al. | |
| 2004/0245425 A1 | 12/2004 | Delpiano et al. | |
| 2004/0258360 A1 * | 12/2004 | Lim | B82Y 20/00 385/43 |
| 2004/0259279 A1 | 12/2004 | Erchak et al. | |
| 2004/0264840 A1 | 12/2004 | Mule et al. | |
| 2005/0033858 A1 | 2/2005 | Swildens et al. | |
| 2005/0058416 A1 | 3/2005 | Hoon Lee et al. | |
| 2005/0082552 A1 | 4/2005 | Fang et al. | |
| 2005/0105853 A1 | 5/2005 | Liu et al. | |
| 2005/0123244 A1 | 6/2005 | Block et al. | |
| 2005/0185893 A1 * | 8/2005 | Liu | G02B 6/1228 385/50 |
| 2005/0202554 A1 | 9/2005 | Luo et al. | |

(56) References Cited

U.S. PATENT DOCUMENTS

| | | |
|---|---|---|
| 2005/0211465 A1 | 9/2005 | Sunohara et al. |
| 2005/0211993 A1 | 9/2005 | Sano et al. |
| 2005/0213618 A1 | 9/2005 | Sochava et al. |
| 2005/0226284 A1 | 10/2005 | Tanaka et al. |
| 2005/0286426 A1 | 12/2005 | Padhye et al. |
| 2006/0002443 A1 | 1/2006 | Farber et al. |
| 2006/0093002 A1 | 5/2006 | Park et al. |
| 2006/0104322 A1 | 5/2006 | Park et al. |
| 2006/0109542 A1 | 5/2006 | Mizuuchi et al. |
| 2006/0115215 A1 | 6/2006 | Liu et al. |
| 2006/0285797 A1 | 12/2006 | Little et al. |
| 2007/0002924 A1 | 1/2007 | Hutchinson et al. |
| 2007/0223549 A1* | 9/2007 | Livshits ............. G02B 6/1228 372/45.01 |
| 2007/0280326 A1 | 12/2007 | Piede et al. |
| 2008/0002928 A1 | 1/2008 | Li et al. |
| 2008/0266639 A1 | 10/2008 | Melloni et al. |
| 2009/0016399 A1 | 1/2009 | Bowers |
| 2009/0020499 A1 | 1/2009 | Nottola et al. |
| 2009/0087137 A1 | 4/2009 | Doan et al. |
| 2009/0135861 A1 | 5/2009 | Webster et al. |
| 2009/0225796 A1 | 9/2009 | Kato |
| 2009/0267173 A1 | 10/2009 | Takahashi et al. |
| 2009/0278233 A1 | 11/2009 | Pinnington et al. |
| 2009/0294803 A1 | 12/2009 | Nuzzo et al. |
| 2009/0310140 A1 | 12/2009 | Smith et al. |
| 2010/0040327 A1 | 2/2010 | Deki et al. |
| 2010/0042668 A1 | 2/2010 | Liang et al. |
| 2010/0111128 A1 | 5/2010 | Qin et al. |
| 2010/0114846 A1 | 5/2010 | LaChapelle et al. |
| 2010/0123145 A1 | 5/2010 | Lee et al. |
| 2010/0238855 A1 | 9/2010 | Yoshida et al. |
| 2010/0247037 A1 | 9/2010 | Little |
| 2010/0266288 A1 | 10/2010 | Little et al. |
| 2010/0302992 A1 | 12/2010 | Zhuang et al. |
| 2011/0012261 A1 | 1/2011 | Choi et al. |
| 2011/0032964 A1 | 2/2011 | Sauer et al. |
| 2011/0044193 A1 | 2/2011 | Forenza et al. |
| 2011/0085572 A1 | 4/2011 | Dallesasse et al. |
| 2011/0085577 A1 | 4/2011 | Krasulick et al. |
| 2011/0085760 A1 | 4/2011 | Han et al. |
| 2011/0089524 A1 | 4/2011 | Nonogaki |
| 2011/0158584 A1 | 6/2011 | Popovic |
| 2011/0163444 A1 | 7/2011 | Hayashi |
| 2011/0165707 A1 | 7/2011 | Lott et al. |
| 2011/0205660 A1 | 8/2011 | Komura et al. |
| 2011/0211604 A1 | 9/2011 | Roscher |
| 2011/0216997 A1 | 9/2011 | Gothoskar et al. |
| 2011/0217002 A1 | 9/2011 | Mekis et al. |
| 2011/0267676 A1 | 11/2011 | Dallesasse et al. |
| 2012/0001166 A1 | 1/2012 | Doany et al. |
| 2012/0002694 A1 | 1/2012 | Bowers et al. |
| 2012/0002931 A1 | 1/2012 | Watanabe |
| 2012/0057079 A1 | 3/2012 | Dallesasse et al. |
| 2012/0057609 A1 | 3/2012 | Dallesasse et al. |
| 2012/0057610 A1 | 3/2012 | Dallesasse et al. |
| 2012/0057816 A1 | 3/2012 | Krasulick et al. |
| 2012/0091594 A1 | 4/2012 | Landesberger et al. |
| 2012/0093456 A1 | 4/2012 | Taillaert et al. |
| 2012/0120978 A1 | 5/2012 | Budd et al. |
| 2012/0149148 A1 | 6/2012 | Dallesasse et al. |
| 2012/0170931 A1 | 7/2012 | Evans et al. |
| 2012/0189317 A1 | 7/2012 | Heck et al. |
| 2012/0224813 A1 | 9/2012 | Chen et al. |
| 2012/0230635 A1 | 9/2012 | Yoshida |
| 2012/0264256 A1 | 10/2012 | Dallesasse et al. |
| 2012/0294321 A1* | 11/2012 | Ma ..................... G02B 5/288 372/20 |
| 2012/0320939 A1 | 12/2012 | Baets et al. |
| 2013/0022312 A1 | 1/2013 | Taillaert et al. |
| 2013/0037905 A1 | 2/2013 | Shubin et al. |
| 2013/0051727 A1 | 2/2013 | Mizrahi et al. |
| 2013/0107741 A1 | 5/2013 | Huang et al. |
| 2013/0170793 A1 | 7/2013 | Ushida et al. |
| 2013/0210214 A1 | 8/2013 | Dallesasse et al. |
| 2013/0216177 A1 | 8/2013 | Tseng et al. |
| 2013/0251299 A1 | 9/2013 | He et al. |
| 2013/0301975 A1 | 11/2013 | Spann et al. |
| 2013/0302920 A1 | 11/2013 | Dallesasse et al. |
| 2014/0179036 A1 | 6/2014 | Krasulick et al. |
| 2014/0233593 A1* | 8/2014 | Qureshi ................ H01S 3/083 372/20 |
| 2014/0252411 A1 | 9/2014 | Kang et al. |
| 2014/0270620 A1 | 9/2014 | Anderson et al. |
| 2014/0319656 A1 | 10/2014 | Marchena et al. |
| 2015/0043002 A1* | 2/2015 | Kuznetsov ............ G02B 5/28 356/479 |
| 2015/0097211 A1 | 4/2015 | Krasulick et al. |
| 2015/0184994 A1* | 7/2015 | Flanders ........... G01B 9/02004 356/479 |
| 2015/0219853 A1 | 8/2015 | Kumar et al. |
| 2015/0234124 A1 | 8/2015 | Tseng et al. |
| 2015/0253471 A1* | 9/2015 | Takahashi ............ G02B 6/122 385/122 |
| 2015/0253472 A1 | 9/2015 | Kumar et al. |
| 2015/0288141 A1* | 10/2015 | Fallahi ..................... H01S 3/07 372/20 |
| 2015/0316723 A1 | 11/2015 | Taylor et al. |
| 2015/0346429 A1 | 12/2015 | Lambert |
| 2015/0346430 A1 | 12/2015 | Li |
| 2016/0170142 A1 | 6/2016 | Lambert et al. |
| 2016/0306111 A1 | 10/2016 | Lambert |
| 2017/0090118 A1 | 3/2017 | Sodagar et al. |

FOREIGN PATENT DOCUMENTS

| | | |
|---|---|---|
| EP | 0696747 A2 | 2/1996 |
| EP | 2141525 A1 | 1/2010 |
| EP | 2544319 A1 | 1/2013 |
| EP | 2648906 A1 | 10/2013 |
| EP | 2751603 A1 | 7/2014 |
| JP | H09197179 A | 7/1997 |
| JP | 2000-089054 A | 3/2000 |
| JP | 2003-078530 A | 3/2003 |
| JP | 2006-186446 A | 7/2006 |
| JP | 2007-074202 A | 3/2007 |
| JP | 2010-522372 A | 7/2010 |
| JP | 2010-199972 A | 9/2010 |
| JP | 2010-281899 A | 12/2010 |
| JP | 2011-075917 A | 4/2011 |
| JP | 2013-507792 A | 3/2013 |
| JP | 2014-525608 A | 9/2014 |
| KR | 2014-0060547 A | 5/2014 |
| KR | 2014-0060548 A | 5/2014 |
| TW | 2011-40975 A | 11/2011 |
| WO | 03/012512 A1 | 2/2003 |
| WO | 2010/033435 A2 | 3/2010 |
| WO | 2011/046898 A1 | 4/2011 |
| WO | 2012/078361 A1 | 6/2012 |
| WO | 2013/033252 A1 | 3/2013 |
| WO | 2013/109955 A1 | 7/2013 |
| WO | 2014/021411 A | 2/2014 |
| WO | 2014/025824 A2 | 2/2014 |
| WO | 2014/176561 A1 | 10/2014 |
| WO | 2015/054491 A1 | 4/2015 |
| WO | 2015/120260 A1 | 8/2015 |
| WO | 2015/134968 A1 | 9/2015 |
| WO | 2015/183992 A1 | 12/2015 |
| WO | 2016/172202 A1 | 10/2016 |

OTHER PUBLICATIONS

U.S. Appl. No. 14/615,942, "First Action Interview Pilot Program Pre-Interview Communication", filed Aug. 25, 2016, 4 pages.

U.S. Appl. No. 14/615,942, "Notice of Allowance", dated Dec. 14, 2016, 15 pages.

U.S. Appl. No. 14/642,429, "Final Office Action", dated Feb. 22, 2016, 20 pages.

U.S. Appl. No. 14/642,429, "Non-Final Office Action", dated Oct. 27, 2015, 17 pages.

U.S. Appl. No. 14/642,429, "Notice of Allowance", dated Jun. 15, 2016, 8 pages.

(56) References Cited

OTHER PUBLICATIONS

Selected fil history from U.S. Appl. No. 14/642,429, filed Mar. 9, 2015, 102 pages.
U.S. Appl. No. 14/722,970, "Non Final Office Action", dated Jan. 26, 2017, 7 pages.
U.S. Appl. No. 14/722,983, "Notice of Allowance", dated Jan. 18, 2017, 10 pages.
U.S. Appl. No. 14/722,983, "Supplemental Notice of Allowance", dated Feb. 1, 2017, 2 pages.
U.S. Appl. No. 15/051,348, "Non-Final Office Action", dated May 19, 2017, 11 pages.
U.S. Appl. No. 15/133,898, "Non-Final Office Action", dated Mar. 7, 2017, 8 pages.
U.S. Appl. No. 15/133,920, "Non-Final Office Action", dated Oct. 6, 2016, 15 pages.
U.S. Appl. No. 15/262,937, "Notice of Allowance", dated Jan. 25, 2017, 12 pages.
U.S. Appl. No. 15/588,128. "Notice of Allowance", dated May 29, 2018, 7 pages.
U.S. Appl. No. 15/588,128, "Final Office Action", dated Jan. 17, 2018, 9 pages.
U.S. Appl. No. 15/588,128, "Non-Final Office Action", dated Jun. 2, 2017, 5 pages.
PCT/US2015/014801, "International Preliminary Report on Patentability", dated Aug. 18, 2016, 11 pages.
PCT/US2015/014801, "International Search Report and Written Opinion", dated May 11, 2015, 14 pages.
PCT/US2015/019430, "International Preliminary Report on Patentability", dated Sep. 22, 2016, 6 pages.
PCT/US2015/019430, "International Search Report and Written Opinion", dated May 29, 2015, 9 pages.
PCT/US2015/032725, "International Preliminary Report on Patentability", dated Dec. 8, 2016, 8 pages.
PCT/US2015/032725, "International Search Report and Written Opinion", dated Aug. 27, 2015, 11 pages.
PCT/US2016/028431, "International Search Report and Written Opinion", dated Jul. 28, 2016, 16 pages.
Analui, "A Fully Integrated 20-Gb/s Optoelectronic Transceiver Implemented in a Standard 0.13-CMOS SOI Technology", IEEE Journal of Solid-State Circuits, vol. 41, Issue 12, Dec. 2006, pp. 2945-2955.
Barkai et al., "Efficient Mode Converter for Coupling between Fiber and Micrometer Size Silicon Waveguides", 4th IEEE International Conference on Group IV Photonics, Sep. 21, 2007, pp. 49-51.
Coldren, "Monolithic Tunable Diode Lasers", IEEE Journal on Selected Topics in Quantum Electronics, vol. 6, No. 6, Dec. 2000, pp. 988-999.
Coldren et al., "Tunable Semiconductor Lasers: A Tutorial", Journal of Lightwave Technology, vol. 22, Issue 1, Jan. 2004, pp. 193-202.
Hildebrand et al., "The Y-Laser: A Multifunctional Device for Optical Communication Systems and Switching Networks", Journal of Lightwave Technology, vol. 11, issue 12, Dec. 1993, pp. 2066-2075.
Isaksson et al., "10 Gb/s Direct Modulation of 40 nm Tunable Modulated-Grating Y-branch Laser", Optical Fiber Communication Conference and Exposition and The National Fiber Optic Engineers Conference, 2005.
Khilo et al., "Efficient Planar Fiber-to-Chip Coupler Based on Two-Stage Adiabatic Evolution", Optics Express, vol. 18, Issue 15, 2010, pp. 15790-15806.
Kuznetsov et al., "Asymmetric Y-Branch Tunable Semiconductor Laser with 1.0 THz Tuning Range", IEEE Photonics Technology Letters, vol. 4, issue 10, Oct. 1992, pp. 1093-1095.
Laroy et al., "Characteristics of the New Modulated Grating Y laser (MG-Y) for Future WDM Networks", IEEE/LEOS Benelux Chapter, Nov. 2003, pp. 55-58.
Laroy, "New Concepts of Wavelength Tunable Laser Diodes for Future Telecom Networks", Universiteit Gent, 2006, 162 pages.
Laroy, "New Widely Tunable Laser Concepts for Future Telecommunication Networks", FTW-symposium, Belgium,, Dec. 11, 2002, 2 pages.
Lumerical Knowledge Base, "Evanescent Waveguide Couplers", retrieved Mar. 6, 2015 from Internet: https://kb.lumerical.com/en/pic_passive_waveguide_couplers_evanescent.html.
Magno et al., "Multiphysics Investigation of Thermo-optic Effect in Silicon-on-Insulator Waveguide Arrays", Excerpt from the Proceedings of the COMSOL Users Conference, 2006, 6 pages.
Morthier, "Advanced Widely Tunable Edge-Emitting Laser Diodes and Their Application in Optical Communications", Ghent University—IMEC, 2000, 23 pages.
Morthier et al., "New Widely Tunable Edge-Emitting Laser Diodes at 1.55 μm Developed in the European IST-project NEWTON", Semiconductor and Organic Optoelectronic Materials and Devices, Feb. 28, 2005.
Morthier, "New Widely Tunable Lasers for Optical Networks", NEWTON Project Number: IST-2000-28244, Dec. 2001, 5 pages.
Park et al., "A Fiber-to-Chip Coupler Based on Si/SiON Cascaded Tapers for Si Photonic Chips", Optics Express, vol. 21, Issue 24, 2013, pp. 29313-29319.
Passaro et al., "Investigation of Thermo-Optic Effect and Multireflector Tunable Filter/Multiplexer in SOI Waveguides", Optics Express, vol. 13, Issue 9, May 2, 2005, pp. 3429-3437.
Wesström et al., "Design of a Widely Tunable Modulated Grating Y-branch Laser Using the Additive Vernier Effect for Improved Super-Mode Selection", IEEE 18th International Semiconductor Laser Conference, 2002, pp. 99-100.
Wesström et al., "State-of-the-Art Performance of Widely Tunable Modulated Grating Y-Branch Lasers", Optical Fiber Communication Conference, Dec. 13, 2004.
Yamada, "Chapter 1: Silicon Photonic Wire Waveguides: Fundamentals and Applications", Silicon Photonics II; Topics in Applied Physics, vol. 119, 2011, pp. 1-29.

\* cited by examiner

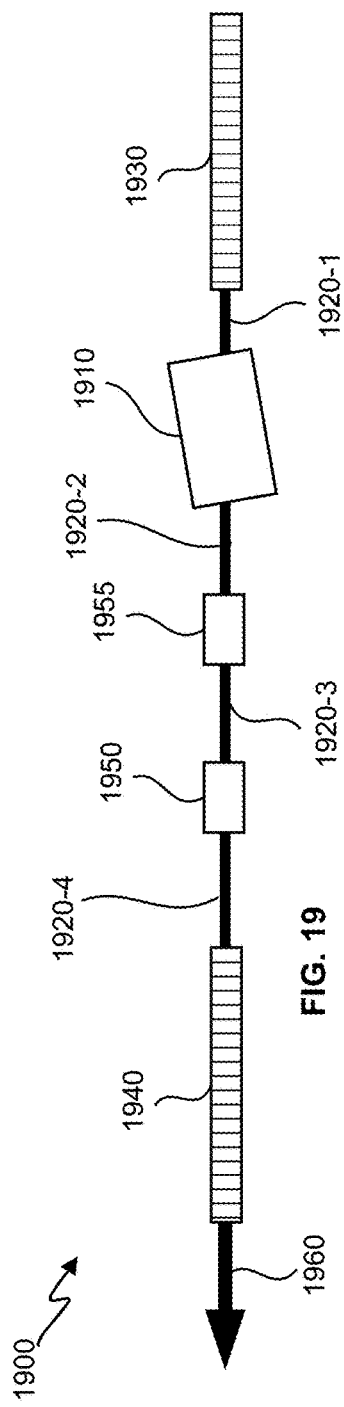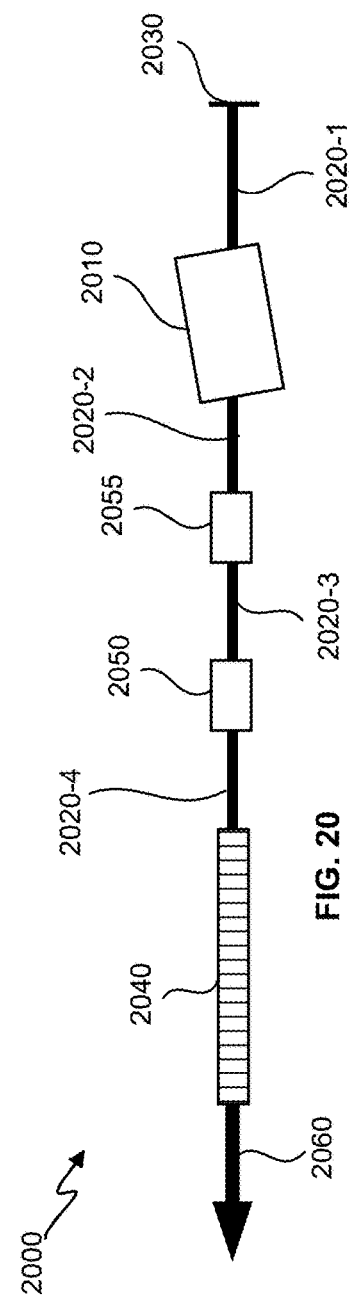

WIDE SHOULDER, HIGH ORDER MODE FILTER FOR THICK-SILICON WAVEGUIDES

CROSS-REFERENCE TO RELATED APPLICATIONS

This application is a continuation of U.S. patent application Ser. No. 15/588,128, filed on May 5, 2017, entitled "Wide Shoulder, High Order Mode Filter For Thick-Silicon Waveguides," which is a continuation of U.S. patent application Ser. No. 15/262,937, filed on Sep. 12, 2016, entitled "Wide Shoulder, High Order Mode Filter For Thick-Silicon Waveguides," now U.S. Pat. No. 9,664,855, issued on May 30, 2017, which is a continuation-in-part application of U.S. patent application Ser. No. 14/642,429, filed on Mar. 9, 2015, entitled "High-Order-Mode Filter for Semiconductor Waveguides," now U.S. Pat. No. 9,465,163, issued on Oct. 11, 2016, which claims priority to U.S. Provisional Patent Application No. 61/949,916, filed on Mar. 7, 2014, entitled "High-Order-Mode Filter for Semiconductor Waveguides." U.S. patent application Ser. No. 15/262,937 also claims priority to U.S. Provisional Patent Application No. 62/292,645, filed on Feb. 8, 2016, entitled "Wide Shoulder, High Order Mode Filter For Thick-Silicon Waveguides." The disclosures of the above-identified patent applications are incorporated by reference in their entireties for all purposes.

BACKGROUND OF THE INVENTION

Optical waveguiding elements convey light from one point to another through an optically transparent, elongated structure by modal transmission, total internal reflection, and/or total reflectorization. An optical waveguide directs radiation in the visible, infrared, and/or ultra-violet portions of the radiation spectrum by total internal reflection.

BRIEF SUMMARY OF THE INVENTION

Embodiments of the present invention provide an optical filter for passing a fundamental mode of a guided optical wave while filtering/attenuating higher-order modes. Optical filters, in some embodiments, are used to filter higher-order modes from inside an optical resonator (e.g., a laser cavity). In some embodiments, optical filters are used to prevent higher-order modes from being excited in other structures (e.g., passive structures such as gratings, multimode interference structures, and/or directional couplers). In some embodiments, the optical filter does not bend the fundamental mode, reducing potential loss of the fundamental mode and/or saving space on a chip.

In some embodiments, an optical filter for attenuating higher-order modes in an optical waveguide comprises a shoulder slab, a waveguide ridge, a first filter ridge, and a second filter ridge. The shoulder slab has a near end opposite a far end; the shoulder slab is made of a first material having a first index of refraction; the shoulder slab is disposed on a second material having a second index of refraction; and the first index of refraction is higher than the second index of refraction. The waveguide ridge is disposed on the shoulder slab. The waveguide ridge traverses the shoulder slab from the near end to the far end; and the waveguide ridge is configured to receive light at the near end and guide the light to the far end. The first filer ridge is disposed on the shoulder slab; traverses the shoulder slab from the near end to the far end; is on a first side of the waveguide ridge; is separated from the waveguide ridge by a first gap. The second filter ridge traverses the shoulder slab from the near end to the far end; the second filter ridge is on a second side of the waveguide ridge; the second side of the waveguide ridge is opposite the first side of the waveguide ridge; and the second filter ridge is separated from the waveguide ridge by a second gap. In some embodiments, the waveguide ridge traverses the shoulder slab in a straight line from the near end to the far end. In some embodiments, a combined height of the shoulder slab and waveguide ridge is greater than 0.7 µm and less than 2.0 µm. in some embodiments, the first material is crystalline silicon and the second material is $SiO_2$.

In some embodiments, a method for filtering higher-order modes in a semiconductor waveguide is disclosed. A beam of light having a fundamental mode and one or more higher-order modes is transmitted in a first semiconductor waveguide. In the optical filter, the one or more higher-order modes along a direction of beam propagation are attenuated while light of the fundamental mode is transmitted along the direction of beam propagation. The optical filter comprises a waveguide ridge for guiding the fundamental mode and two filter ridges separated from the waveguide ridge to assist in attenuating the one or more higher-order modes from along the direction of beam propagation. Light of the fundamental mode is coupled into a second semiconductor waveguide, after the light of the fundamental mode has passed through the optical filter and the one or more higher-order modes are attenuated along the direction of beam propagation.

In some embodiments, a method for filtering higher-order modes in an optical waveguide is disclosed. The filter includes a shoulder slab formed of a first material having a first index of refraction. The shoulder slab forms a near end opposite a far end, and is disposed on a second material having a second index of refraction, the first index of refraction being higher than the second index of refraction. The filter also includes a waveguide ridge, formed of the first material and disposed on the shoulder slab. The waveguide ridge traverses the shoulder slab from the near end to the far end, and is configured to guide light of a fundamental mode along a direction of beam propagation from the near end to the far end. The waveguide ridge tapers adiabatically inward from the near end to a central region, and adiabatically outward from the central region to the far end.

In some embodiments, an optical filter for attenuating higher-order modes in an optical waveguide includes a shoulder slab formed of a first material having a first index of refraction and disposed on a second material having a second index of refraction, the first index of refraction being higher than the second index of refraction. The shoulder slab defines a near end having a first width, an intermediate section, adjacent to the first end section, and a far end section, adjacent to the intermediate section and opposite the first end section along a direction of beam propagation. The optical filter also includes a waveguide ridge, formed of the first material and disposed atop the shoulder slab, that traverses the shoulder slab, and is configured to guide light of a fundamental mode along the direction of beam propagation from the near end section to the far end section.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 19 schematically illustrates a laser that includes an optical filter for higher order modes, in accord with an embodiment.

FIG. 20 schematically illustrates a laser that includes an optical filter for higher order modes, in accord with an embodiment.

Figure 1:
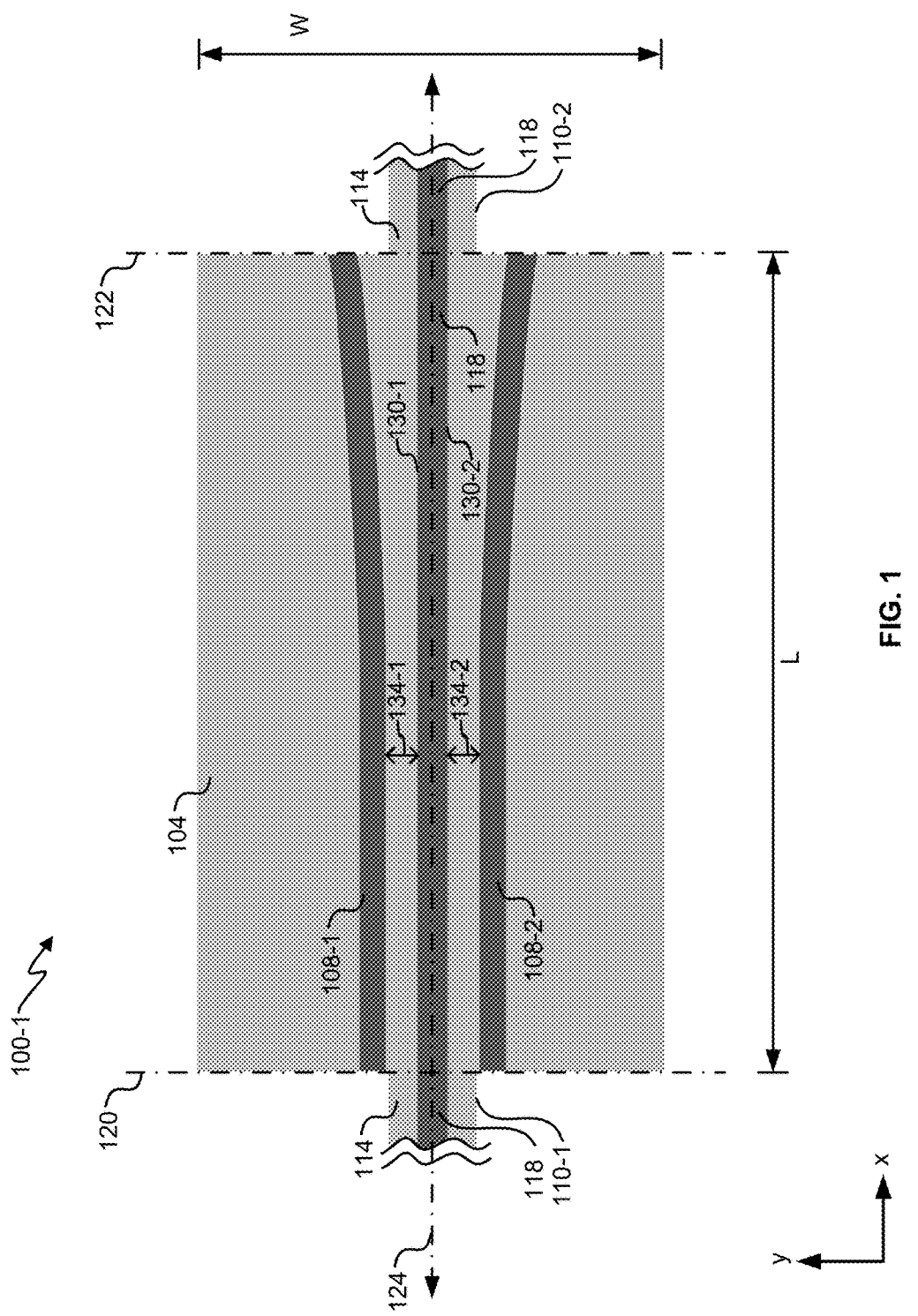
FIG. 1 depicts a simplified top view of an embodiment of a first optical filter for filtering higher-order modes.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Embodiments relate generally to filtering higher-order modes from a fundamental mode in an optical waveguide. More specifically, and without limitation, to filtering higher-order modes in high-contrast, thick-silicon waveguides. Light propagating in higher-order modes can adversely affect performance of some optical devices. Filtering higher-order modes can increase performance and/or reduce loss in some optical devices. Higher-order modes in multi-mode, silica optical fibers can be attenuated by mandrel wrapping (wrapping an optical fiber around a specified sized rod a specified number of time). A somewhat corresponding technique in thin-silicon waveguides is to use bends in the thin-silicon waveguides. However, for thick-silicon (wherein thick silicon is greater than 0.3, 0.5, 0.7, or 0.9 μm thick and/or has an effective refractive index greater than or equal to 2.9, 3.0, or 3.2), bends are relatively large (e.g., ~750 m radius) to prevent loss to the fundamental mode because thick silicon has a higher effective refractive index than thin silicon and the modes are more tightly confined. A relatively large bend requires longer waveguides (and hence more attenuation) and a larger footprint on a chip. Thus in some embodiments, optical filters for filtering higher-order modes are provided that are relatively short (e.g., length less than 150, 120, or 100 μm) and have a relatively small footprint (e.g., an area less than 6000, 4000, or 2400 μm$^2$). Some embodiments in this disclosure provide a higher-order mode filter in semiconductor material (e.g., in a semiconductor having a waveguide in a lattice, such as crystalline silicon and/or a crystalline III-V compound).

The present disclosure and appended claims use relative position terminology such as "up," "down," "above," "below," "height," "depth," "overlying," "underlying," "top," "bottom," "on," "under," "atop" and the like. All such terms are to be understood in the context of the structures shown in FIG. 5, in the orientation in which that drawing is shown. For example, with reference to FIG. 5, substrate 504 is at the bottom of waveguide 110, shoulder 114 and waveguide ridge 118 are successively on, above or atop substrate 504, upper cladding 508 overlies shoulder 114 and waveguide ridge 118, and height is a vertical offset in the orientation shown.

In some embodiments, a filter is made by layering a shoulder slab (e.g., comprising silicon) on top of a substrate (e.g., comprising silicon dioxide, SiO2). A waveguide ridge and two filter ridges are disposed on the shoulder. The waveguide ridge and the two filter ridges are substantially parallel. As light is guided in the waveguide ridge, a first mode (e.g., a fundamental mode) remains mostly confined in the waveguide ridge. But higher-order modes couple to the two filter ridges and energy in the higher-order modes is dispersed from being guided by the waveguide ridge. In some embodiments, there is little or no loss of energy of the first mode (e.g., 1$^{st}$ TE mode) and there is minimal transmission light in of higher-order modes (e.g., attenuation greater than or equal to 9 dB for the higher-order modes). In some embodiments, there is less than 10%, 5%, and/or 3% attenuation of the first mode (beyond attenuation of the first mode from material of the waveguide). Additionally, in some embodiments there are minimal reflections (e.g., <1%) from higher-order modes.

Referring first to FIG. 1, a simplified top view of an embodiment of first optical filter 100-1 for filtering higher-order modes is shown. The optical filter 100 comprises a substrate, a shoulder slab 104 disposed on the substrate, and one or more filter ridges 108 disposed on the shoulder slab 104. In the embodiment shown, there is a first filter ridge 108-1 and a second filter ridge 108-2. In some embodiments, the optical filter 100 comprises an upper cladding that covers the shoulder slab 104 and filter ridges 108. In some embodiments, the shoulder slab 104 and the filter ridges 108 are made of the same material (e.g., both crystalline silicon) and/or are contiguous. The shoulder slab 104 and/or the filter ridges 108 have a higher index of refraction than the substrate and the upper cladding. For example, in some embodiments the substrate and/or upper cladding is SiO2.

The optical filter 100 is coupled with two or more waveguides 110. Each waveguide 110 comprises a waveguide shoulder 114 and a waveguide ridge 118. In some embodiments, the two or more waveguides 110 are disposed on the same substrate as the optical filter 100. The optical filter 100 has a near end 120 and a far end 122, where the far end 122 is opposite the near end 120. A first waveguide 110-1 is coupled with the optical filter 100 at the near end 120. A second waveguide 110-2 is coupled with the optical filter 100 at the far end 122. The waveguide ridge 118 traverses the optical filter 100 from the near end 120 to the far end 122 and couples with the first waveguide 110-1 and the second waveguide 110-2. The waveguide ridge 118 creates an optical ridge waveguide for guiding a first mode from the near end 120 of the optical filter 100 to the far end 122 of the optical filter 100. In some embodiments, the waveguide shoulder 114, the waveguide ridge 118, the shoulder slab 104, and the filter ridges 108 are made of the same material (e.g., crystalline silicon). An optical axis 124 (e.g., direction of beam propagation for the fundamental mode) is parallel with the waveguide ridge 118. Though this embodiment has a straight waveguide ridge 118 in a direction of beam propagation, other embodiments have a curved waveguide ridge 118 (e.g., for connecting to another device in a different direction). In some embodiments, a straight waveguide ridge 118 is used to reduce loss of the first mode.

The first filter ridge 108-1 is disposed on the shoulder slab 104 and traverses the shoulder slab 104 from the near end 120 to the far end 122. The first filter ridge 108-1 is located in a direction away from a first side 130-1 of the waveguide ridge 118. The second filter ridge 108-2 is disposed on the shoulder slab 104 and traverses the shoulder slab 104 from the near end 120 to the far end 122. The second filter ridge 108-2 is located in a direction away from a second side 130-2 of the waveguide ridge 118. The sides 130 of the waveguide ridge 118 are orthogonal, or nearly orthogonal, to the direction of beam propagation of the fundamental mode through the waveguide ridge 118. The first side 130-1 is opposite the second side 130-2. A first gap 134-1 separates the first filter ridge 108-1 from the waveguide ridge 118. A second gap 134-2 separates the second filter ridge 108-2 from the waveguide ridge 118. The shoulder slab 104 has a length L along an x direction, (e.g., the direction of beam propagation). The shoulder slab 104 has a width W along a y direction (e.g., a transverse direction to the direction of beam propagation). Widths of gaps 134 are measured along the y direction.

As an example of how the first optical filter 100-1 works, light enters the optical filter 100 at the near end 120 through the first waveguide 110-1. Light that propagates in a first mode of the first waveguide 110-1 is guided to the far end 122 of the optical filter 100 and to the second waveguide 110-2 by the waveguide ridge 118. But light that propagates in higher-order modes (e.g., higher than the $1^{st}$ mode and/or higher than both the first TE mode and the first TM mode) from the first waveguide 110-1 is coupled out of the waveguide ridge 118 by the first filter ridge 108-1 and the second filter ridge 108-2, and does not couple into the second waveguide 110-2.

Figure 2:
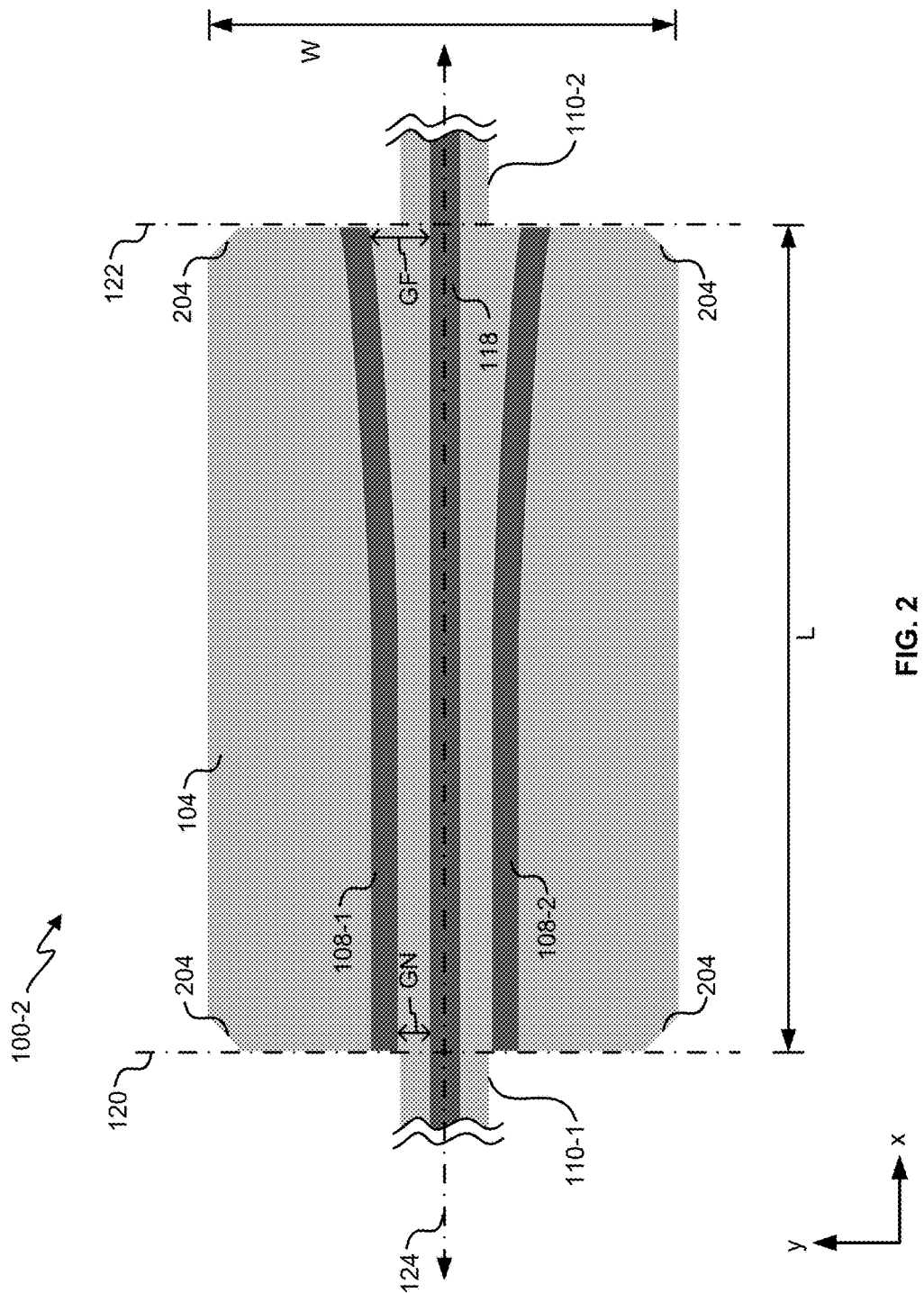
FIG. 2 depicts a simplified top view of an embodiment of a second optical filter for filtering higher-order modes.

Referring next to FIG. 2, a simplified top view of a second optical filter 100-2 for filtering higher-order modes is shown. The second optical filter 100-2 is similar to the first optical filter 100-1, except the shoulder slab 104 of the second optical filter 100-2 has beveled corners 204. The beveled corners 204 are used to reduce the likelihood that reflections from higher-order modes will reflect back into the waveguides 110. The beveled corners 204 in the second optical filter 100-2 are shown as straight bevels set at 45 degrees. But other types of bevels could be used (e.g., rounded bevels and/or straight bevels at angles greater than or less than 45 degrees). In some embodiments, straight bevels at 45 degrees are used because of ease of manufacturing and the 45 degrees encourages light from higher-order modes to reflect around in the shoulder slab 104 instead of into the waveguides 110.

In some embodiments, a width of the first gap 134-1 and a width of the second gap 134-2 are functions of length of the shoulder slab 104 (e.g., gap width is a function of x). In some embodiments, a width of the first gap 134-1 and a width of the second gap 134-2 have constant values for x=0 to x=L/2. From x=L/2 to x=L, the filter ridges 108 bend away from the waveguide ridge 118 along an arc, wherein the arc has a radius of curvature R. In some embodiments, R=500 µm±50 µm, L=100 µm±10 µm, and W=40 µm±5 µm. In some embodiments, the first gap 134-1 has a width, GN, at the near end 120, and a width, GF, at the far end 122. In some embodiments, the width of the second gap 134-2 is equal to the width of the first gap 134-1 for all values x (e.g., the optical filter 100 is symmetrical about the optical axis 124).

Figure 3:
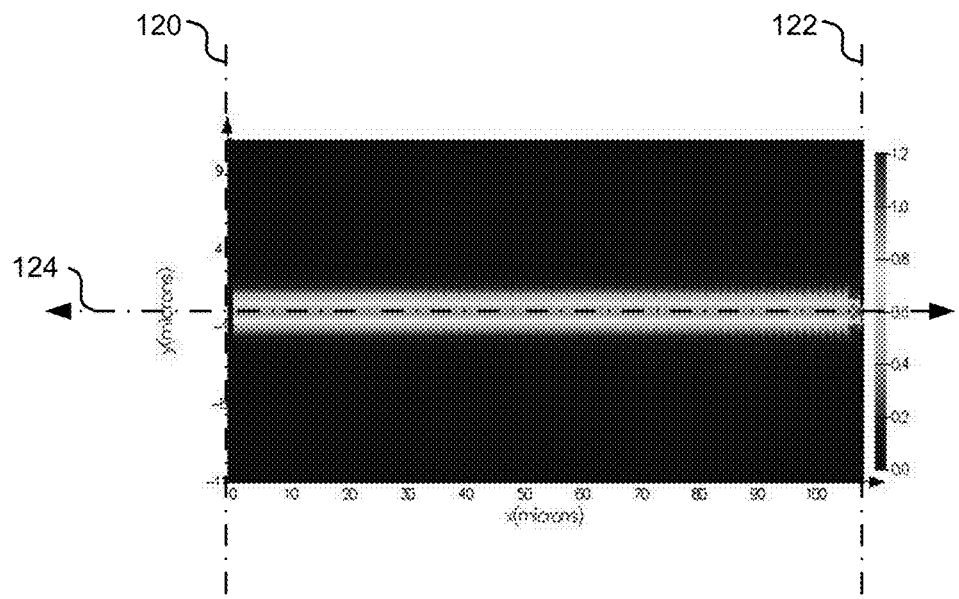
FIG. 3 depicts a simulation of a fundamental mode in an optical filter for filtering higher-order modes.

FIG. 3 depicts a simulation of a fundamental mode in an optical filter for filtering higher-order modes. The fundamental mode (e.g., first mode) is transmitted from the near end 120 of the optical filter 100 to the far end 122 of the optical filter 100 confined by the waveguide ridge 118. (i.e., not much light is dispersing into other regions of the shoulder slab 104).

Figure 4:
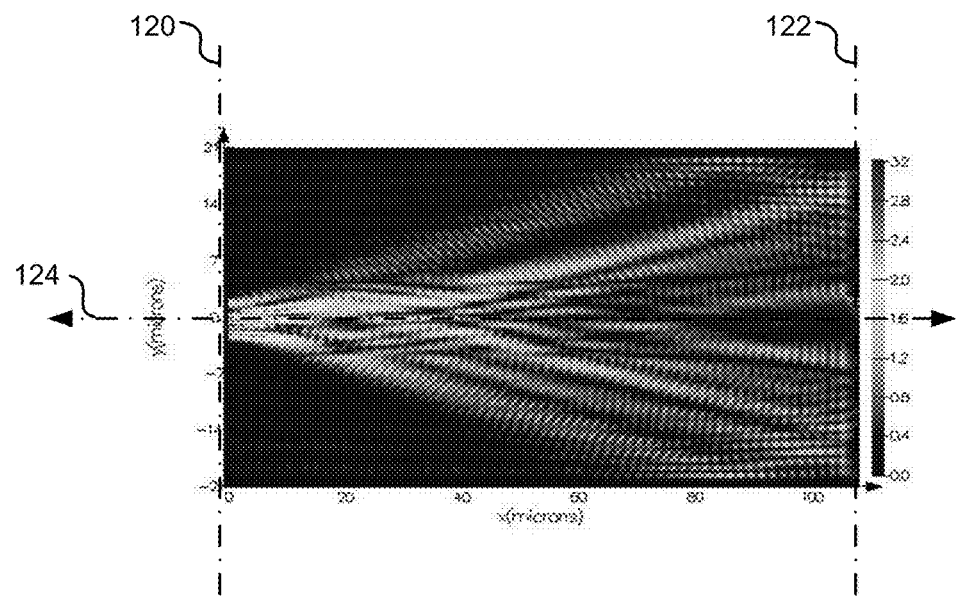
FIG. 4 depicts a simulation of higher-order modes being attenuated in the optical filter.

FIG. 4 depicts a simulation of higher-order modes being scattered in the optical filter 100. In FIG. 4, TE modes two through seven are simulated. As mode number increases, loss increases (e.g., measured by a percentage of light of a given mode from the first waveguide 110-1 that is not coupled into the second waveguide 110-2). In comparison to FIG. 3, light in higher-order modes is greatly attenuated along the waveguide ridge 118 when transmitted from the near end 120 to the far end 122 (i.e., very little light propagating in higher-order modes exits the filter 100 and into the second waveguide 110-2). Higher-order modes have more attenuation along the optical axis 124 because the higher-order modes are not as suppressed by the waveguide ridge 118 (e.g., higher-order modes are larger and/or have a diffraction angle that causes the higher-order modes to disperse). In some embodiments, lengths and widths are important for a compact and/or efficient optical filter 100.

Figure 5:
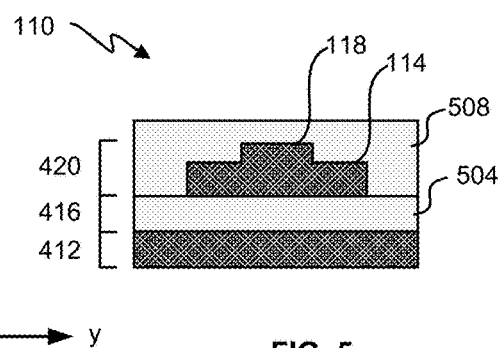
FIG. 5 depicts a simplified cross section of an embodiment of a waveguide.

FIG. 5 depicts a simplified cross section of an embodiment of a waveguide 110. The waveguide 110 comprises a waveguide shoulder 114 and a waveguide ridge 118 on top of the waveguide shoulder 114. The waveguide ridge 118 is more narrow than the waveguide shoulder 114. Both the waveguide shoulder 114 and the waveguide ridge 118 are made of crystalline silicon. The waveguide shoulder 114 is disposed on a substrate 504. An upper cladding 508 covers the waveguide shoulder 114 and the waveguide ridge 118. In some embodiments, the waveguide 110 is made from a silicon-on-insulator (SOI) wafer. The SOI wafer has a handle portion 512, a buried oxide (BOX) portion 516 (e.g., SiO2), and a device layer 520. The BOX portion 516 comprises the substrate 504. The waveguide shoulder 114 and the waveguide ridge 118 are formed by etching the device layer 520. After the waveguide shoulder 114 and the waveguide ridge 118 are formed, the waveguide shoulder 114 and the waveguide ridge 118 are covered with the upper cladding 508 (e.g., SiO2, epoxy, and/or photoresist). Similarly, in some embodiments, the optical filter 100 is also formed using a SOI wafer and covered with an upper cladding 508. In some embodiments, the optical filter 100 is formed at the same time as the waveguide 110. SiO2 has a lower index of refraction than crystalline silicon.

In some embodiments, the waveguide shoulder 114 has a width (y direction) between 2 and 10 μm (e.g., 4, 5, 6, or 7 μm). The waveguide shoulder 114 has a height (z direction) between 0.1 to 5 μm, or 0.5 to 3 μm (e.g., 0.25, 0.4, 0.5, 0.75, 0.85, 0.95, 1, 1.05, 1.1, 1.25, 1.5, or 1.75 m). The waveguide ridge 118 has a width (y direction) between 1 and 4 μm, (e.g., 1.5, 2.0, 2.2, 2.4, or 2.5 μm). The waveguide ridge 118 has a height (z direction) (above the waveguide shoulder 114) between 0.1 and 3 μm (e.g., 0.25, 0.45, 0.50, 0.55, 0.60, 0.75, μm). In some embodiments, the waveguide shoulder 114 and the waveguide ridge 118 have a combined height (z direction) between 0.5 and 5 μm (e.g., 0.7, 1.0, 1.5, 1.25, 1.5, or 2 μm). Though the waveguide 110 is shown having the waveguide ridge 118, in some embodiments, the waveguide has a rectangular cross section (e.g., the width of the waveguide ridge 118 is equal to the width of the waveguide shoulder 114; or viewed another way, the height of the waveguide ridge 118 equals zero, and/or the waveguide shoulder 114 has a height greater than a height of the shoulder slab 104). The waveguide shoulder 114 and the waveguide ridge 118 act as a core of the waveguide 110. The substrate 504 and the upper cladding 508 are cladding layers to the core. In some embodiments, the upper cladding 508 is air. The upper cladding 508 and the substrate 504 are made of materials that have a lower index of refraction than the core.

Figure 6:
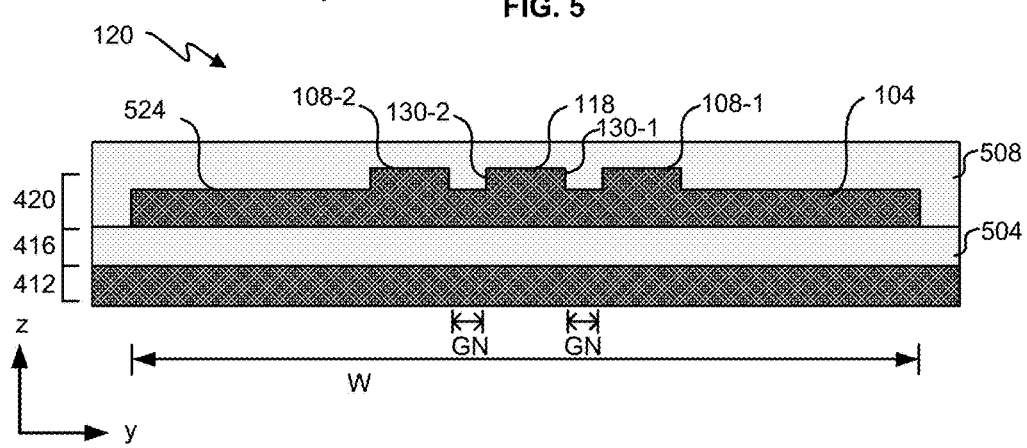
FIG. 6 depicts an embodiment of a cross section at a near end of an optical filter.

Referring next to FIG. 6, an embodiment of a cross section at the near end 120 of an optical filter 100 is shown. The cross section at the near end 120 shows the shoulder slab 104 disposed on the substrate 504. In some embodiments, the height of the shoulder slab 104 is 0.1 to μm tall, in a z direction (e.g., 0.25, 0.4, 0.5, 0.75, 0.85, 0.95, 1, 1.05, 1.1, 1.25, 1.5, or 1.75 μm). In some embodiments, the height of the shoulder slab 104 is equal to the height of the waveguide shoulder 114. Three ridges extend from the shoulder slab 104 and in a direction normal to a top surface 524 of the shoulder slab 104: the first filter ridge 108-1, the second filter ridge 108-2, and the waveguide ridge 118. In some embodiments, the first filter ridge 108-1 and the second filter ridge 108-2 have similar heights and widths as the waveguide ridge 118. The first filter ridge 108-1 and the waveguide ridge 118 are separated by GN (width of the first gap 134-1 at the near end 120). The second filter ridge 108-2 and the waveguide ridge 118 are separated by the distance GN (width of the second gap 134-2 at the near end 120). In some embodiments, GN is between 1 and 5 μm (e.g., 1, 1.5, 2, 2.5, or 3 μm).

Figure 7:
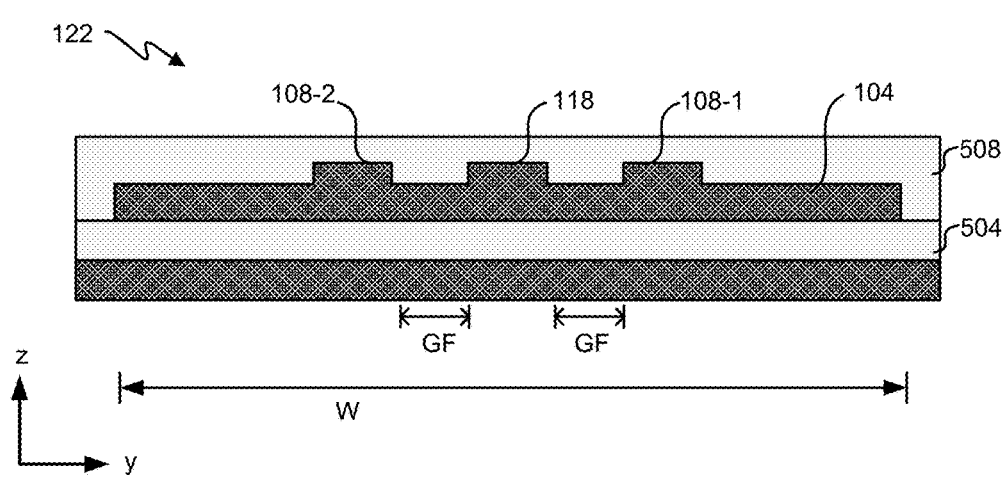
FIG. 7 depicts an embodiment of a cross section at a far end of the optical filter.

Referring next to FIG. 7, an embodiment of a cross section at the far end 122 of an optical filter 100 is shown. The cross section at the far end 122 is similar to the cross section at the near end 120 in FIG. 6, except widths of the gaps 134 between the waveguide ridge 118 and the filter ridges 108 is increased. In some embodiments, heights and widths of the waveguide ridge 118 and the filter ridges 108 remain constant. The first filter ridge 108-1 and the waveguide ridge 118 are separated by GF (width of the first gap 134-1 at the far end 122). The second filter ridge 108-2 and the waveguide ridge 118 are separated by the distance GF (width of the second gap 134-2 at the far end 122). In some embodiments, GF is between 1.5 and 10 μm (e.g., 2, 3, or 5 μm). In some embodiments, GF is equal to GN.

There are many variations to the embodiments that are shown and described above. For example, the figures above show embodiments designed for 1550 nm light. For different wavelengths, different dimensions can be used. For example, widths of ridges, heights/thickness of shoulders and ridges, and gaps between ridges can be narrowed for shorter wavelengths of light. Additionally, the filter ridges 108 can be doped with lossy material. In some embodiments, the filter ridges 108 are coated with metal, Germanium, or other lossy materials.

Figure 8:
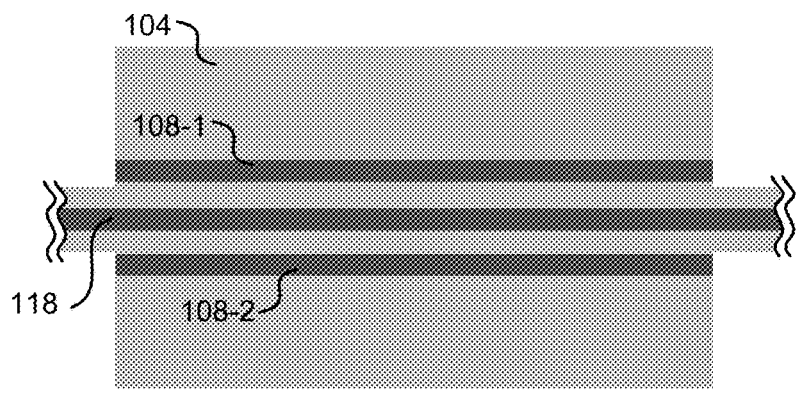
FIGS. 8-16 depict additional example embodiments of optical filters.
Figure 9:
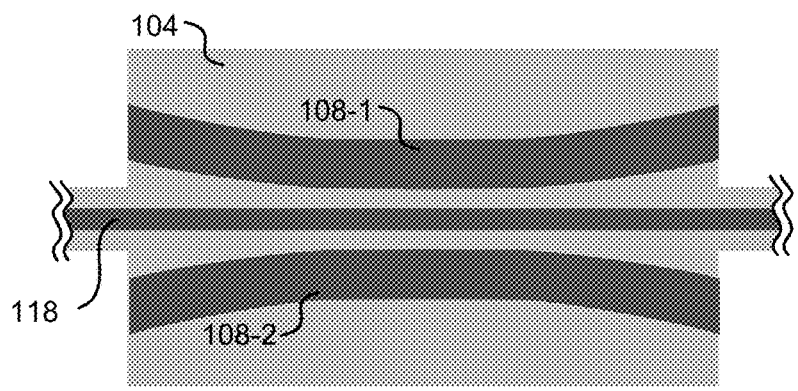
Figure 10:
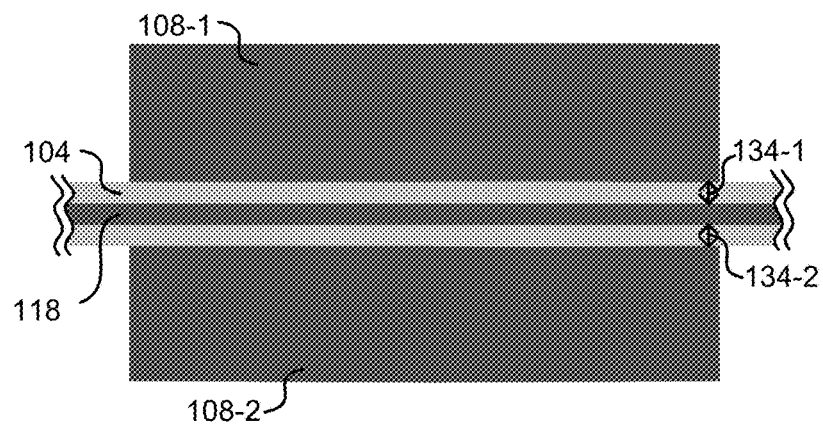

FIGS. 5-16 depict additional example variations of optical filters 100. Persons skilled in the art will recognize the examples in FIGS. 8-16 are not meant to provide an exhaustive list but that additional variations and/or combinations could be used. In FIG. 8, the filter ridges 108 do not bend, but are straight. In FIG. 9, the filter ridges 108 are much wider than the waveguide ridge 118. In some embodiments, the filter ridges 108 have a width that is equal to or greater than twice the width of the waveguide ridge 118. Additionally, the filter ridges 108 bend at the near 120 and the far end 122, such that the near end 120 is symmetrical to the far end (i.e., the optical filter 100 in FIG. 9 is reversible). In some embodiments, having a reversible filter is not desirable because bending regions of the ridges 108 decrease coupling, and the filter might have to be longer. In FIG. 10, another reversible filter, the filter ridges 108 have width from the gaps 134 to an edge of the shoulder slab 104; and a width of the gaps 134 remains constant.

Figure 11:
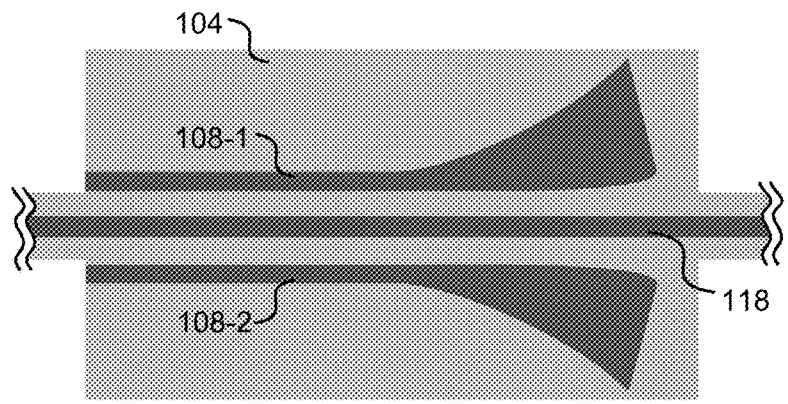
Figure 12:
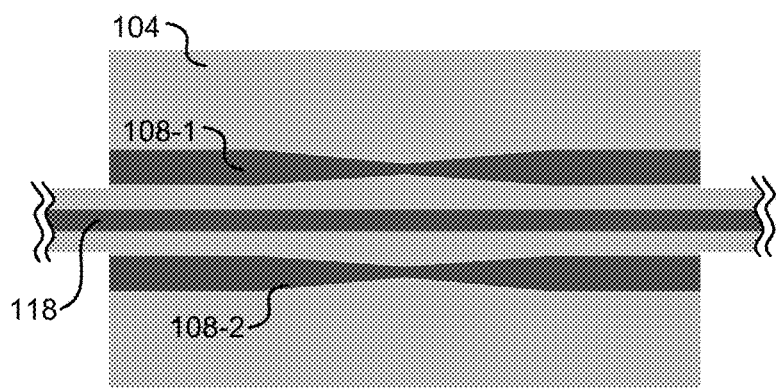
Figure 13:
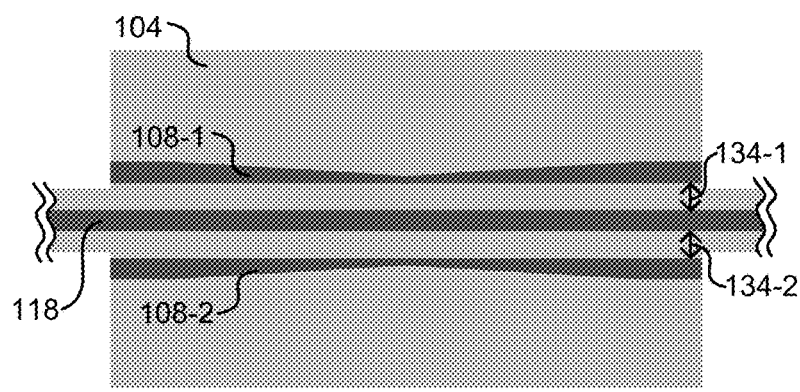

In FIG. 11, the filter ridges 108 are tapered at ends and do not extend to the far end 122. In FIG. 12, the ridges 108 taper (narrow) on each side of the filter ridge 108 and taper (expand) on each side of the filter ridge 108. FIG. 13 is similar to FIG. 12, except only one side of each filter ridge 108 (an outer side) narrows and expands, leaving widths of gaps 132 constant. In some embodiments, the ridges 108 taper in (e.g., in FIGS. 12 and 13) to better couple (i.e., filter) different modes. For example, a filter ridge 108 that is more narrow is likely to better couple modes that are higher than a filter ridge 108 that is wider. In some embodiments, widths of ridges 108 keep expanding from the near end 120 to the far end 122 (e.g., constant width for a first distance, taper wider, constant width for a second distance, taper even wider, etc.; or one continuous taper from the near end 120 to the far end 122).

Figure 14:
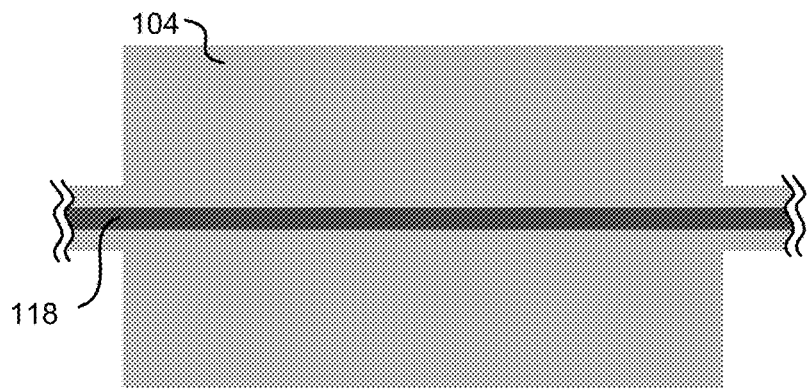
Figure 15:
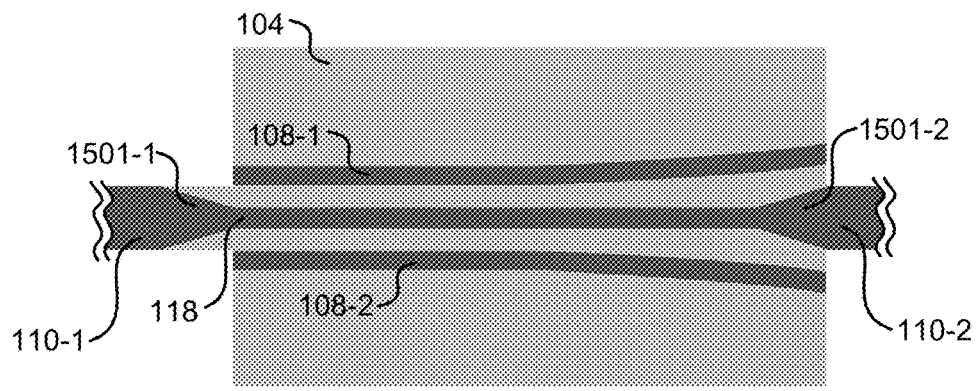
Figure 16:
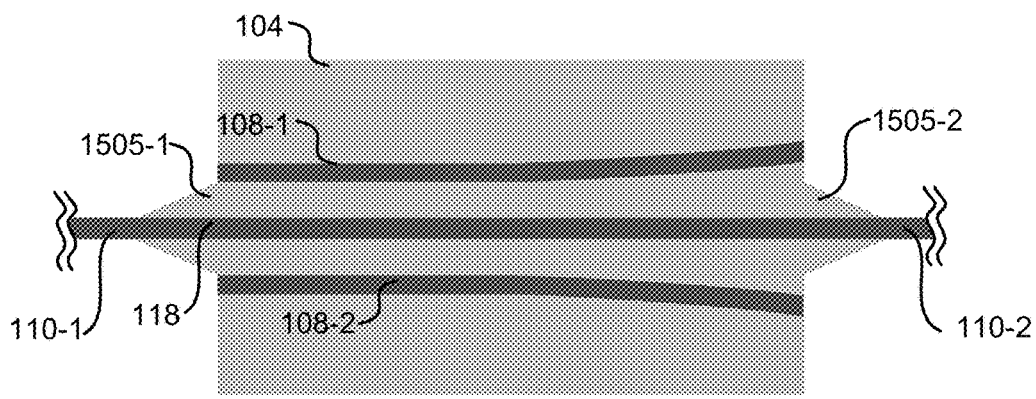

In FIG. 14, there are no filter ridges 108, and higher-order modes "leak out" into the shoulder 104, away from the waveguide ridge 118. Such a configuration may need to be longer than a filter with filter ridges 108. FIGS. 15 and 16 provide examples of an optical filter 100 coupling to waveguides 110 that have a rectangular cross section. FIG. 15 uses a first waveguide-ridge taper 1501-1 and a second waveguide-ridge taper 1501-2. The first waveguide-ridge taper 1501-1 narrows a top portion of the first waveguide 110-1 to a width of the waveguide ridge 118. Without the first waveguide-ridge taper 1501-1 there would be reflections from the first waveguide 110-1 coupling into the optical filter 100. The second waveguide-ridge taper 1501-2 begins to taper within the optical filter 100 before coupling to the second waveguide 110-2 to reduce a length of a combination of the optical filter 100 and second waveguide 110-2. In some embodiments, the second waveguide ridge 1501-2 tapers after the optical filter 100. FIG. 16 uses a first shoulder taper 1505-1 and a second shoulder taper 1505-2 to narrow the shoulder slab 104 to the first waveguide 110-1 and to the second waveguide 110-2. The first waveguide 110-1 and the second waveguide 110-2 each have a width as wide as the waveguide ridge 118.

In some embodiments, the shoulder slab 104 is much thinner, or not used at all (e.g., the waveguide ridge 118 and the filter ridges 108 are disposed on the substrate 504 without a shoulder). The width of the first gap 134-1 and the width of the second gap 134-2 are then decreased so that higher-order modes are coupled into the filter ridges 108 but the fundamental mode is not. In some embodiments, a shoulder, which is wider than the waveguide ridge 118, is disposed on the substrate 504 under the waveguide ridge 118, but the filter ridges 108 do not have shoulders wider than the filter ridges 108. In some embodiments, the waveguide ridge 118 has a shoulder wider than the waveguide ridge 118, the first filter ridge 108-1 has a shoulder wider than the first filter ridge 108-1, and the second filter ridge 108-2 has a shoulder wider than the second filter ridge 108-2; but the shoulder of the waveguide ridge 118 does not touch the shoulder of the first filter ridge 108-1 or the shoulder of the second filter ridge 108-2. In some embodiments, shoulders of the waveguide ridge 118, the first filter ridge 108-1, and/or the second filter ridge 108-2 are tapered.

In some embodiments, the filter ridges 108 do not entirely traverse the shoulder slab 104. For example, the first filter ridge 108-1 could extend from the near end 120 and terminate before reaching the far end 122. In some embodiments, a ridge is disposed on a shoulder either through deposition or by etching areas next to the ridge to form the ridge on the shoulder. In another example, the waveguide ridge 118 is disposed on a shoulder region; and the shoulder region extends beyond the filter ridges 108 and/or the shoulder slab 104 (e.g., to the edge of the substrate). In this example, a shoulder slab can be defined as a sub-area of the shoulder region (i.e., the shoulder region need not terminate at a boundary of the shoulder slab 104). In some embodiments, ends of the filter ridges 108 are modified, such as using single-sided or double-sided tapers (e.g., expanding or narrowing tapers).

Several embodiments are directed to thick-silicon, high-contrast waveguides. But in some embodiments, optical filters 100 are used in other multimode and single-mode waveguides. For example, filters can be made of polymers for polymer waveguides. Filters can be made for low-contrast, and/or thin-silicon, waveguides. In some embodiments, filters are made of aluminum oxide, tantalum oxide, titanium oxide, or other dielectric materials (e.g., to increase attenuation of higher-order modes). In some embodiment, a filter is used to filter out reflections or other light from a single-mode waveguide. The single-mode waveguide could be in a semiconductor, dielectric, and/or polymer. For example, a~300 nm tantalum oxide waveguide is used in the hard-drive industry. These waveguides usually support only a fundamental TE/TM mode. If light is scattered or reflected into a waveguide (e.g., through a bend or shoulder region), then a filter using similar techniques can be used to reduce the scattered or reflected light (e.g., a leaky mode) traveling in the single-mode (or multimode) waveguide. In some embodiments, waveguides 110 and optical filters 100 are made of III-V compounds (e.g., GaAs, InP, InGaAs, etc.) and/or II-VI compounds. In some embodiments, filter ridges 108 terminate (e.g., at a wall at the far end 122) so that light from the filter ridges 108 is not guided to another device and/or structure beyond the filter 100. In some embodiments, the waveguide ridge 118 is straight from the near end 120 to the far end 122. By not having bends in the waveguide ridge 118 of the optical filter 100, there is less attenuation of the fundamental mode.

Figure 17:
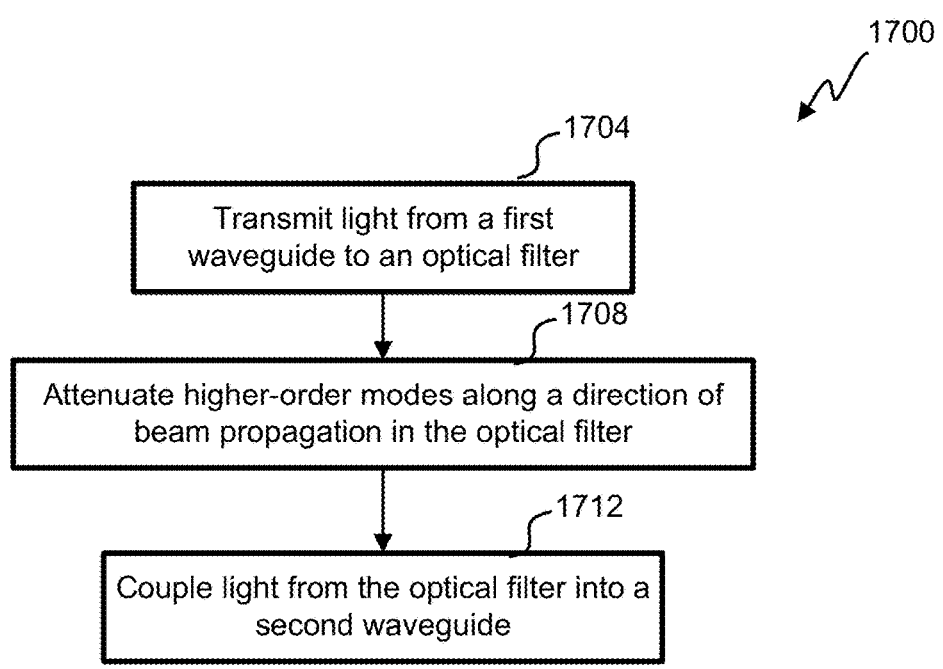
FIG. 17 depicts a flowchart of an embodiment of a process for using an optical filter to attenuate higher-order modes from a fundamental mode in a semiconductor waveguide.

FIG. 17 depicts a flowchart of an embodiment of a process 1700 for filtering higher-order modes in a semiconductor waveguide. The process 1700 starts in step 1704, a beam of light is transmitted from a first semiconductor waveguide 110-1 to an optical filter 100. The beam of light comprises light in a fundamental mode and light in one or more higher-order modes. In step 1708 higher-order modes are attenuated from along a direction of beam propagation (e.g., a direction of the waveguide ridge 118). The fundamental mode is directed along the direction of beam propagation (e.g., attenuated from under the waveguide ridge 118). In some embodiments, the higher-order modes are attenuated by coupling power of the higher-order modes to the two filter ridges 108 and/or the shoulder slab 104. In step 1712, light from the optical filter 100 is coupled into the second waveguide 110-2. Since the higher-order modes are attenuated, and the fundamental mode is not, light entering the second waveguide 110-2 is single mode, or nearly single mode. In some embodiments, the waveguide ridge 118 is straight to reduce loss by bending, and/or to reduce a footprint size of the optical filter on a chip.

Figure 18:
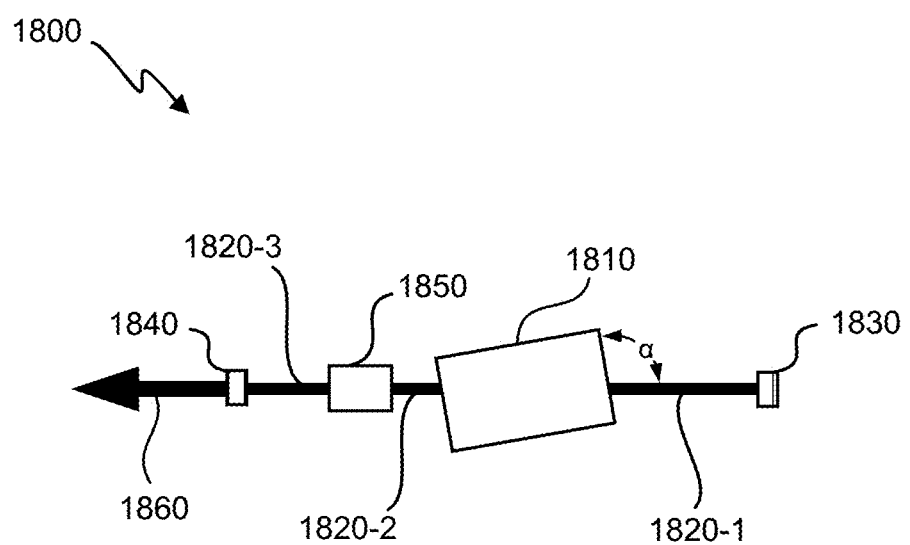
FIG. 18 schematically illustrates a laser that includes an optical filter for higher order modes, in accord with an embodiment.

FIG. 18 schematically illustrates a laser 1800 that includes an optical filter for higher order modes. Laser 1800 includes a gain chip 1810 in optical communication with first and second waveguides 1820-1, 1820-2 that may be examples of waveguides 110 discussed previously. In certain embodiments, gain chip 1810 interfaces with first and second waveguides 1820-1, 1820-2 at a tilted angle α other than 90 degrees, as suggested in FIG. 18, to mitigate reflection effects from edges of gain chip 1810. This tilt is optional, that is, other embodiments utilize α=90 degrees. An optical filter 1850 is in optical communication with waveguide 1820-2 and a further waveguide 1820-3. Optical filter 1850 may be an example of any of optical filters 100 or 2100 discussed herein, such that as light propagates through optical filter 1850, a fundamental mode thereof transmits with minimal insertion loss, but higher order optical modes are attenuated. In embodiments, the addition of optical filter 1850 causes laser 1800 to operate as a single mode laser, which without optical filter 1850 may have operated as a multimode laser. Thus, inclusion of optical filter 1850 in laser 1800 is particularly advantageous in that by filtering higher order modes, the lasing action (e.g., stimulated emission) of chip 1810 will divert more energy to the fundamental mode than to higher order modes, improving power efficiency and reducing energy wasted as heat. Waveguides 1820-1 and 1820-3 interface with respective first and second reflectors 1830 and 1840 that define a resonant cavity for laser 1800. Second reflector 1840 is partially transparent such that an optical output 1860 emits through reflector 1840. One of skill in the art will appreciate numerous other modifications, alternative constructions, and equivalents. For example, instead of (or in addition to) first reflector 1840 being partially transparent, second reflector 1830 could be partially transparent and emit optical output. Also, the positions of optical filter 1850 and gain chip 1810 could be reversed within laser 1800.

FIG. 19 schematically illustrates a laser 1900 that includes an optical filter for higher order modes. Laser 1900 includes a gain chip 1910 in optical communication with first and second waveguides 1920-1, 1920-2 that may be examples of waveguides 110 discussed above. In certain embodiments, gain chip 1910 interfaces with first and second waveguides 1920-1, 1920-2, optionally at a tilted angle, as described above in connection with laser 1800. An optical filter 1950 is in optical communication with further waveguides 1920-3 and 1920-4. Optical filter 1950 may be an example of any of optical filters 100 or 2100 discussed herein, such that as light propagates through optical filter 1950, a fundamental mode thereof transmits with minimal insertion loss, but higher order optical modes are attenuated. Waveguides 1920-1 and 1920-4 interface with respective first and second reflectors 1930 and 1940 that define a resonant cavity for laser 1900. In certain embodiments, reflectors 1930 and/or 1940 are binary superimposed gratings (BSGs) that may be wavelength-tunable by current injection or temperature variation. In other embodiments, reflectors 1930 and/or 1940 are distributed Bragg reflectors (DBRs). BSGs typically provide multiple, spectrally narrow reflectance peaks, while DBRs typically provide a single, wider main reflectance peak. Also within the resonant cavity is a phase adjuster 1955 that may be utilized to align a particular longitudinal mode of the resonant cavity with a selected reflectance peak. Second reflector 1940 is partially transparent such that an optical output 1960 emits through reflector 1940. Similar to laser 1800 (FIG. 18), inclusion of optical filter 1950 in laser 1900 is particularly advantageous in that by filtering higher order modes, the lasing action (e.g., stimulated emission) of chip 1910 will divert more energy to the fundamental mode than to higher order modes, improving power efficiency and reducing energy wasted as heat. One of skill in the art will appreciate that instead of (or in addition to) first reflector 1940 being partially transparent, second reflector 1930 could be partially transparent and emit optical output. Also, gain chip 1910, optical filter 1950 and/or phase adjuster 1955 may be located at different positions within the resonant cavity. Numerous other modifications, alternative constructions, and equivalents are possible.

FIG. 20 schematically illustrates a laser 2000 that includes an optical filter for higher order modes. Laser 2000 includes many components that are identical to similar components shown in FIG. 19, including a gain chip 2010, a second reflector 2040, an optical filter 2050 and a phase adjuster 2055, all in optical communication with one another through waveguides 2020-2, 2020-3 and 2020-4. Second reflector 2040 is partially transparent such that an optical output 2060 emits through reflector 2040. In certain embodiments, wavelength tunability may be desired, and reflector 2040 may be a BSG, tunable by current injection or temperature variation, similar to reflectors 1930, 1940, FIG. 19. In other embodiments, when wavelength tunability is not required, reflector may be a distributed Bragg reflector (DBR). Laser 2000 also includes a non-wavelength selective mirror 2030 shown schematically in optical communication with gain chip 2010 through a further, optional waveguide 2020-1. Mirror 2030 may be an independent element that interfaces with other components of laser 2000 through waveguide 2020-1, or may be formed at a facet of gain chip 2010 (e.g., at an external facet, or a facet etched into gain chip 2010) in which case waveguide 2020-1 may not be present (see also FIG. 25). When mirror 2030 is formed at a facet of gain chip 2010, the facet may or may not be metalized to enhance its reflectivity. Similar to the case of laser 1900, numerous modifications, alternative constructions, and equivalents are possible, such as locating gain chip 2010, optical filter 2050 and/or phase adjuster 2055 at different positions within the resonant cavity. Also, similar to lasers 1800 and 1900 (FIGS. 18, 19), inclusion of optical filter 2050 in laser 2000 is particularly advantageous in that by filtering higher order modes, the lasing action (e.g., stimulated emission) of chip 2010 will divert more energy to the fundamental mode than to higher order modes, improving power efficiency and reducing energy wasted as heat.

Figure 25A:
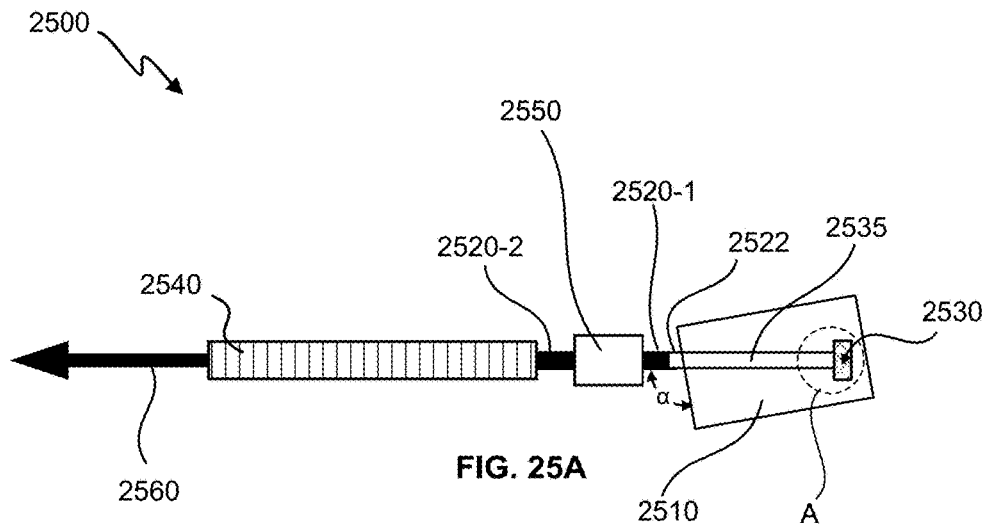
FIG. 25A schematically illustrates a laser 2500 that includes an optical filter for higher order modes, in accord with an embodiment.

FIG. 25A schematically illustrates a laser 2500 that includes an optical filter for higher order modes. Laser 2500 includes certain components that are similar to components shown in FIG. 18-20 such as a BSG or DBR reflector 2540, waveguide segments 2520-1 and 2520-2, and optical filter 2550 for high order modes 2050. In certain embodiments, gain chip 2510 interfaces with first waveguides 2520-1 at a tilted angle α other than 90 degrees, as suggested in FIG. 25, to mitigate reflection effects from edges of gain chip 2510. This tilt is optional, that is, other embodiments utilize α=90 degrees. Gain chip 2510 can be understood as a special case of gain chip 2010 and mirror 2030, FIG. 20, in that a pit 2530 is defined within chip 2510 and a mirror is fabricated therein, and a waveguide 2535 is defined in gain chip 2510 to guide light generated thereby to adjacent waveguide segment 2520-1. A region denoted as 2522 is a bridge element that optically couples waveguide 2535 with waveguide segment 2520-1. Bridge element 2522 may be for example a section of amorphous silicon that is formed after gain chip 2510 is placed, and which substantially matches a refractive index of waveguide 2535 and waveguide segment 2520-1 so that light couples directly between them with minimal reflections and insertion loss. Similar to lasers 1800, 1900 and 2000 (FIGS. 18, 19, 20), inclusion of optical filter 2550 in laser 2500 is particularly advantageous in that by filtering higher order modes, the lasing action (e.g., stimulated emission) of chip 2510 will divert more energy to the fundamental mode than to higher order modes, improving power efficiency and reducing energy wasted as heat. A region denoted as A in gain chip 2510 is illustrated in greater detail in FIG. 25B.

Figure 25B:
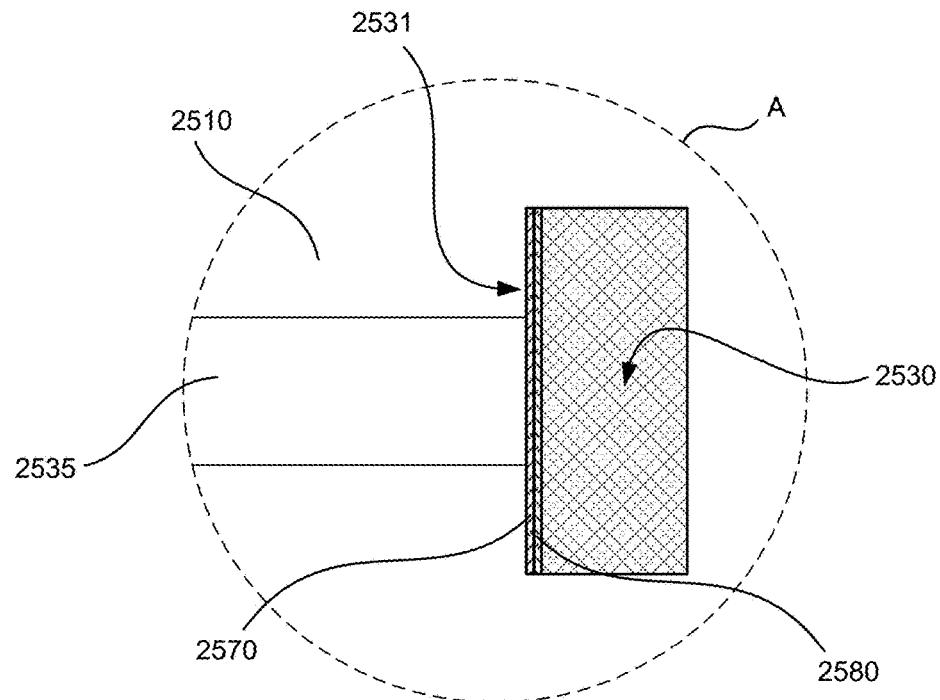
FIG. 25B schematically illustrates structure in one region of FIG. 25A in greater detail.

FIG. 25B schematically illustrates structure in region A, FIG. 25A. Pit 2530 and waveguide 2535 are formed in gain chip 2510 such that a vertical face 2531 of pit 2535 is orthogonal to waveguide 2535, as shown. A dielectric layer 2570 and a metal layer 2580 are formed on vertical face 2531. Dielectric layer 2570 electrically insulates metal layer 2580 from quantum wells of gain chip 2510, while metal layer 2580 acts as a mirror, forming a second end of a cavity whose first end is reflector 2540. Advantages of fabricating a reflector as shown in FIG. 25B include the ability to choose length of a gain region and laser cavity somewhat independently of size of gain chip 2510, by fabricating the reflector after integration of gain chip 2510 into a wafer. Also, insertion loss attributable to a second optical coupling is avoided, that is, whereas gain chips in each of lasers 1800, 1900 and 2000 illustrated in FIGS. 18, 19 and 20 form connections with first and second waveguides enroute to respective cavity ends, gain chip 2510 forms only a single connection with waveguide 2520-1.

Optical filters for high order modes may be somewhat large in physical size, increasing overall size of a system in which such filters are integrated, and possibly increasing insertion loss for the fundamental mode by increasing the volume of material through which the fundamental mode must travel. Certain embodiments herein reduce physical size of an optical high order mode filter, achieving low insertion losses for the fundamental mode while providing acceptable attenuation of high order modes.

Figure 21:
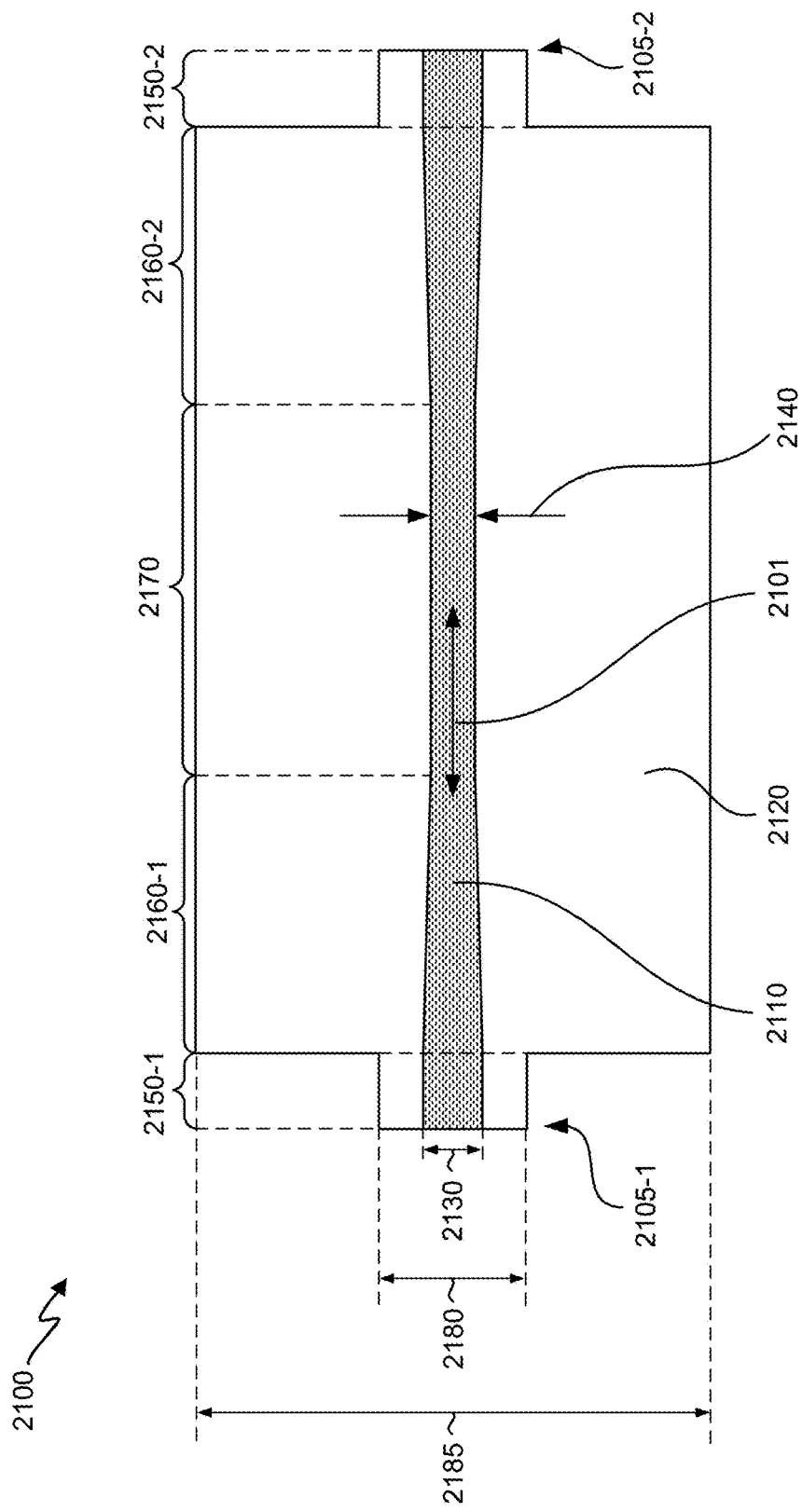
FIG. 21 schematically illustrates an optical filter for higher order modes, in accord with an embodiment.

For example, FIG. 21 schematically illustrates an optical filter 2100 for higher order modes. Similar to optical filter 100 embodiments described above, optical filter 2100 includes a waveguide ridge 2110 formed on a shoulder slab

2120. It should be noted that optical filter 2100 is not necessarily drawn to scale; in particular a vertical dimension of waveguide ridge 2110 (e.g., transverse to the end-to-end direction of waveguide ridge 2110) is exaggerated for illustrative clarity.

Waveguide ridge 2110 is generally formed by selectively etching a semiconductor layer (typically single crystal Si) having an original height of ridge 2110, to form a reduced height of shoulder slab 2120. In certain embodiments, for an application that transmits light having a nominal wavelength of 1550 nm, the total height of ridge 2110 is 1.5 µm, and the reduced height of shoulder slab 2120 is 0.95 µm. Waveguide ridge 2110 and shoulder slab 2120 overlie an electrically insulating region having a lower index of refraction, for example silicon dioxide of an SOI substrate. Ends 2105-1, 2105-2 of optical filter 2100 may couple with one or more waveguides to form optical systems, as discussed above in connection with optical filters 100. For example, shoulder slab 2120 and ridge 2110 may butt couple with the further waveguide(s) along a direction of light propagation 2101, with or without an index matching bridge between ridge 2110 and/or shoulder slab 2120, and the further waveguide(s). Light propagation direction 2101 is shown as a horizontal direction in the orientation of FIG. 21, but it should be understood that light may travel either from left to right or right to left along direction 2101. As suggested by FIG. 21, optical filter 2101 may be symmetric along an axis running along direction of beam propagation 2101, but this is not required.

Shoulder slab 2120 and/or ridge 2110 define width variations along light propagation direction 2101 that cause high order mode filtering effects, as now described. Shoulder slab 2120 defines a first shoulder width 2180 within end sections 2150-1, 2150-2 that interface with further waveguides, and a second shoulder width 2185 within an intermediate section between end sections 2150-1, 2150-2. Similarly, ridge 2110 defines a first width 2130 at end sections 2150-1, 2150-2. In embodiments, ridge 2110 then tapers adiabatically in taper regions 2160-1, 2160-2 to define a second width 2140 that is maintained through a central region 2170, as shown. In embodiments, width 2180 of shoulder slab 2120 and width 2130 of ridge 2110 are equal to respective widths of shoulders and ridges of other waveguides with which optical filter 2100 interfaces.

Ridge width 2130 and shoulder width 2180 are optimized for transmission of a fundamental mode of light of a desired wavelength, but can incidentally also support transmission of higher order modes. In particular, ridge width 2130 and a height of ridge 2110 over shoulder slab 2120 are optimized to confine and guide the fundamental mode substantially within ridge 2110 with some overlap into an underlying shoulder region of shoulder slab 2120. (This is the same condition as illustrated in FIG. 5, where waveguide ridge 118 overlies waveguide shoulder region 114). Higher order modes, however, are not similarly confined or guided, and spill out of ridge 2110 and into the underlying region of shoulder slab 2120.

When light, traveling from right to left in the view of FIG. 21, passes through end region 2150-1 and reaches taper region 2160-1, several things happen. The fundamental mode continues to be guided by ridge 2110, but higher order modes experience diffraction due to the increase in width of shoulder slab 2120. The effect is that of Fraunhofer single-slit diffraction, in which the width 2180 of shoulder slab 2120 acts as a slit source (having width 2180) of the higher order modes, which then radiate into a much larger space as shoulder slab 2120 abruptly changes to second shoulder width 2185. Thus, second shoulder width 2185 is generally at least twice as wide as width 2180; for example, in certain embodiments second shoulder width 2185 is 2, 3, 4, 5, 6.5, 8 or 10 times as wide as width 2180. At the same time, the adiabatic taper of ridge 2110 urges all modes a bit deeper into shoulder slab 2120, where again, the higher order modes are unconfined and susceptible to diffraction, but the fundamental mode continues to be guided by ridge 2110. The diffraction angle is the angle by which high order modes diverge from propagating straight ahead, and depends on the effective slit size for each mode. The interfaces between end region 2105-1 and shoulder region 2160-1 (and between end region 2105-2 and shoulder regions 2160-2) can be considered as the slits for high order modes, whereas ridge 2110 can be considered as the slit for the fundamental mode. Since the fundamental mode is a guided mode, and the ridge size changes adiabatically along ridge 2110, the fundamental mode does not undergo diffraction. However due to the dramatic shoulder discontinuity at the inputs, and because the high order modes are not guided, the high order modes experience a distinct diffraction. Some other factors can also change the effective slit size; usually the higher order the mode, the smaller the effective slit size, and hence the larger the diffraction angle.

All of these effects can be modeled for a given application so that appropriate waveguide ridge width 2130 and height, waveguide taper length, waveguide central region width 2140 and length, waveguide shoulder width 2180 and height, and second shoulder width 2185 can be selected. In particular, single-slit diffraction theory predicts the angles at which second and higher order modes will deviate from the initial propagation direction (e.g., along ridge 2110) within slab 2120, and the fact that successively higher order modes will deviate at greater angles than successively lower order modes. This leads to the result that width and length of slab 2120 need only be optimized for sufficient attenuation of the second order mode, because higher order modes will deviate even more than the second order mode, and will be attenuated even more.

Thus, the tapers within taper regions 2160-1, 2160-2 and the narrow width of central region 2170 may all urge higher order modes originally coupled within ridge 2110 to propagate outward from ridge 2110 within slab 2120, where the higher order modes diffract such that any coupling of the higher order modes back into ridge 2110 is significantly attenuated (see FIG. 22, discussed below).

Shoulder slab 2120, particularly outer edges thereof (e.g., furthest from ridge 2110) may be doped or coated (e.g., with metal or Germanium) or otherwise treated to increase attenuation of the higher order modes. Shoulder slab 2120 may also form beveled corners or other shapes to increase attenuation losses of the higher order modes. Care may be taken in design of shoulder slab 2120 to ensure that higher order modes do not simply reflect from outer walls thereof and couple back into ridge 2110. Key to ensuring this are providing a sufficient width 2185 of shoulder slab 2120, and the attenuation characteristics of material(s) of shoulder slab 2120. One of ordinary skill in the art would recognize many variations, modifications, and alternatives.

Specifics for a particular optical filter 2100 can be determined by simulation. Examples of such specifics include: (A) The longer the wavelength of the intended light, the wider the ridge and shoulders should be, and the longer the adiabatic taper should be. (B) Generally shorter lengths are conducive to compact sizes, shorter cavities and higher yields, but longer lengths are conducive to second- (and higher-) order mode attenuation. One skilled in the art can determine a tradeoff point between these factors for a given application. (C) The taper of ridge 2110 in sections 2160-1 and 2160-2 can vary somewhat; gradual tapers favor true adiabatic behavior (e.g., the fundamental mode will not undergo significant reflection or diffraction) but may increase overall device length. A degree of taper chosen for a particular application may involve a tradeoff between shorter lengths for the benefits noted above, and insertion losses due to reflection and/or diffraction. (D) Heights (thicknesses) of shoulder slabs and ridges may affect confinement and/or diffraction. In one example, 0.95 µm is the height of shoulder 2120, and 0.55 µm is the height of ridge 2110 above shoulder 2120. If ridge 2110 is too short, that is, the etch depth that defines the height of ridge 2110 over shoulder 2120, is lower than 0.55 µm, fundamental mode confinement will be compromised (for 1.55 µm light). If ridge 2110 is too tall, then at some point, second- (or higher-) order modes will be confined within ridge 2110, and diffraction will not take place. In another example, for a thinner shoulder 2120, width of ridge 2110 can be wider and/or the etching-to-slab thickness ratio can be larger in order to maintain confinement of the fundamental mode while still making second- (or higher-) order modes diffract fast enough in shoulder 2120. (E) Shoulder 2120 should be wide enough for a given length of optical filter 2100, higher order modes do not reflect off the lateral edges and couple back into the central waveguide (e.g., where they would be guided by ridge 2110). In general this width depends on the length of optical filter 2100. (F) Ridge 2110 could taper inwardly at first end 2105-1, but not taper back outwardly at the second end 2105-2. Ridge 2110 could taper out to a different output width as compared with the input width. Other design considerations may make output taper desirable.

It will also be understood by one skilled in the art, upon reading and understanding the present disclosure, that certain geometries of optical filter 2100 will generally scale with the wavelength that filter 2100 is intended to be used with. Like the specifics discussed above, the dependence of performance on intended wavelength and the design of feature sizes for specific wavelengths or optical bands can be determined and/or confirmed by direct simulation.

Figure 22:
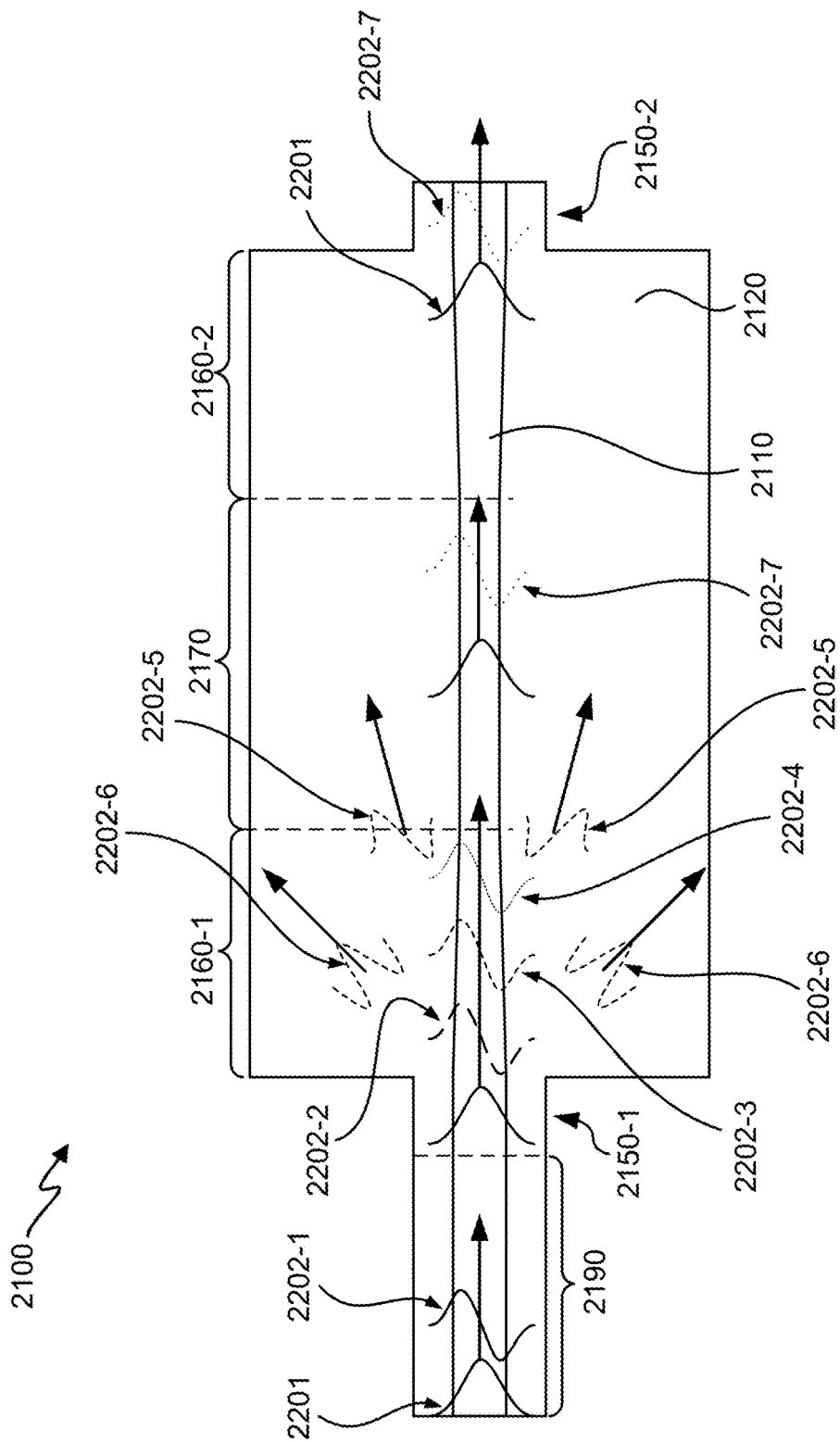
FIG. 22 schematically illustrates operating principles of the optical filter for higher order modes of FIG. 21.

FIG. 22 schematically illustrates operating principles of optical filter 2100, FIG. 21. Optical filter 2100 is as shown in FIG. 21, with a waveguide 2190 abutting end region 2150-1, and ridge 2110 continuing into filter 2100 from an identically sized ridge of waveguide 2190. A first fundamental mode of light represented by a waveform 2201 and a second order transverse mode 2202-1 are illustrated as entering optical filter 2100 from waveguide 2190 and proceeding within waveguide 2190 and ridge 2110 as shown by straight line arrows. However, upon reaching the abrupt transition from end region 2150-1 to adiabatic taper region 2160-1, second order mode 2202-1 begins to diffract outward; also, the width of ridge 2110 becomes narrower, pushing more of second order mode 2202-1 into shoulder slab 2120, where it is less strongly guided than by ridge 2110. The second order transverse mode within ridge 2110 decays, as shown by successively fainter waveforms 2202-2, 2202-3 and 2202-4. Thus, most of the energy originally associated with waveform 2202-1 diffracts away from ridge 2110 as illustrated by waveforms 2202-5, and this energy is eventually absorbed (e.g., converted to heat) within shoulder slab 2120. Third order transverse modes also diffract, at even steeper angles from ridge 2110, as illustrated by waveforms 2202-6. (Angles of arrows associated with waveforms 2202-5 and 2202-6 are intended to be illustrative only and not representative of actual diffraction angles. However, successively higher order modes will diffract through larger angles than lower order modes.) A small portion of the energy from waveform 2202-1 may continue through ridge 2110 as illustrated by waveform 2202-7, and may be emitted from optical filter 2100.

The configuration shown of optical filter 2100 confers significant advantages and can provide acceptable higher order mode attenuation with reduced overall optical filter length, relative to prior art mode filters and relative to filter ridge based mode filters such as mode filters 100 discussed above. One skilled in the art will appreciate that smaller size of any part of a component manufactured on a wafer using integrated circuit type processing, will generate higher yields per wafer. Also, reducing a distance that the fundamental mode traverses will reduce insertion loss for the fundamental mode. Keeping the cavity short and reducing insertion loss both provide advantages for optical filter 2100 over mode filters 100 for intracavity applications, that is, applications such as illustrated in FIGS. 18-20, 25A and 25B, where a mode filter 1850, 1950, 2050 or 2550 as it bounces back and forth within a cavity defined by mirrors. In optical filter 2100, all higher order modes couple outwardly from ridge 2110 to a greater degree than lower order modes, because when ridge 2110 is barely large enough to confine the fundamental mode, each higher order mode will inherently spread faster upon entering the wide shoulder region (e.g., either of regions 2160-1 or 2160-2, depending on the direction of light travel). That is, as discussed above while the fundamental mode will continue to be guided by ridge 2110, higher order modes will diffract at successively larger diffraction angles according to the order of each mode. Thus, when geometries of optical filter 2100 are optimized to attenuate the second high order mode, the third and higher modes will have greater attenuation and be simultaneously optimized, simplifying design and providing better tolerance to manufacturing errors, thickness tolerances and geometric variations. Transmission and attenuation of the fundamental, second and higher order transverse modes can be simulated to determine appropriate waveguide, taper and central portion lengths and widths for a given embodiment of optical filter 2100 (for example, see FIG. 24, discussed below). Desired geometries can be chosen based on tradeoffs between attenuation, insertion loss and size for a given application. Certain applications may demand greater attenuation and/or lower insertion loss characteristics than others. One of ordinary skill in the art would recognize many variations, modifications, and alternatives.

It should also be noted that the illustration in FIG. 22 presents only characteristics of light traveling in one particular direction. Were optical filter 2100 to be used in a system that always provided light entering through end region 2150-1 and exiting through end region 2150-2, tapered region 2160-2 would not be strictly necessary. However, in practice, ridge waveguides within a system are often of uniform width. Rather than butting a narrower waveguide section (e.g., with the width of central region 2170) into a waveguide of greater width, which may generate unwanted diffraction and/or partial reflections of the fundamental mode, it may be advantageous to provide tapered region 2160-2 to provide a smooth transition. Also, many systems may require light to traverse an optical filter in both directions, for example when an optical filter is provided as an intracavity filter (e.g., optical filters 1950, 2050, FIGS. 19 and 20). In these cases, providing both tapered regions 2160-1 and 2160-2 provides high order mode filtering for light passing in both directions.

Figures 26A, 26B, 26C:
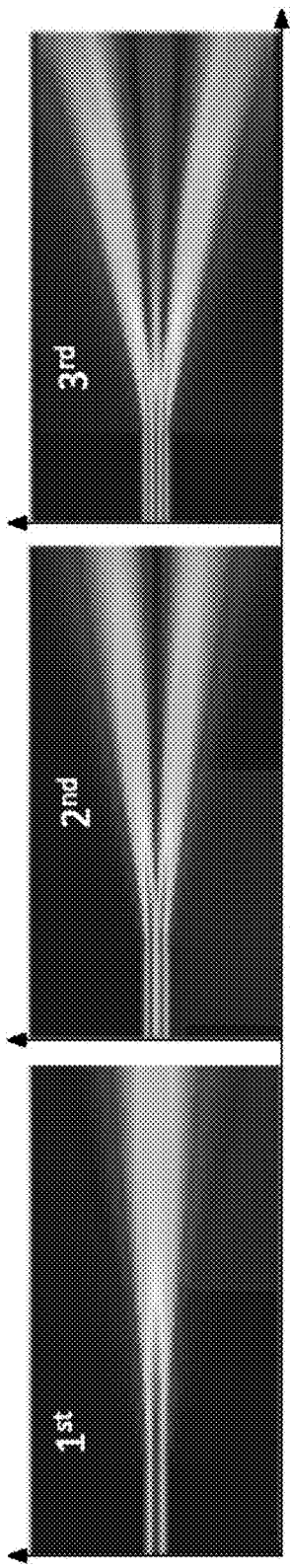
FIGS. 26A, 26B and 26C illustrate the principle of single slit Fraunhofer diffraction for modes of light in a solid that transitions abruptly from a narrow region to a wide region.

FIGS. 26A, 26B and 26B illustrate the principle of single slit Fraunhofer diffraction for modes of light in a solid that transitions abruptly from a narrow region to a wide region. In each of FIGS. 26A, 26B and 26B, the illustrated structures do not include ridges but rather flat structures in which light travels from left to right, and which change abruptly in width at a location noted as $X_0$ in each drawing. FIG. 26A represents behavior of a fundamental or first-order mode. Because the structure illustrated does not include a ridge, the fundamental mode diffracts somewhat after passing $X_0$, but remains highest in intensity along the original direction of travel. FIG. 26B represents behavior of the second order mode. After passing $X_0$, the second order mode diffracts with the majority of the beam splitting into two beams at shallow angles with respect to the original direction of travel. FIG. 26C represents behavior of the third order mode. After passing $X_0$, the third order mode diffracts with the majority of the beam splitting into two beams at greater angles with respect to the original direction of travel, than the beams shown in FIG. 26B. A third component can be seen continuing along the original direction of travel and eventually diffracting to some extent.

Figure 23:
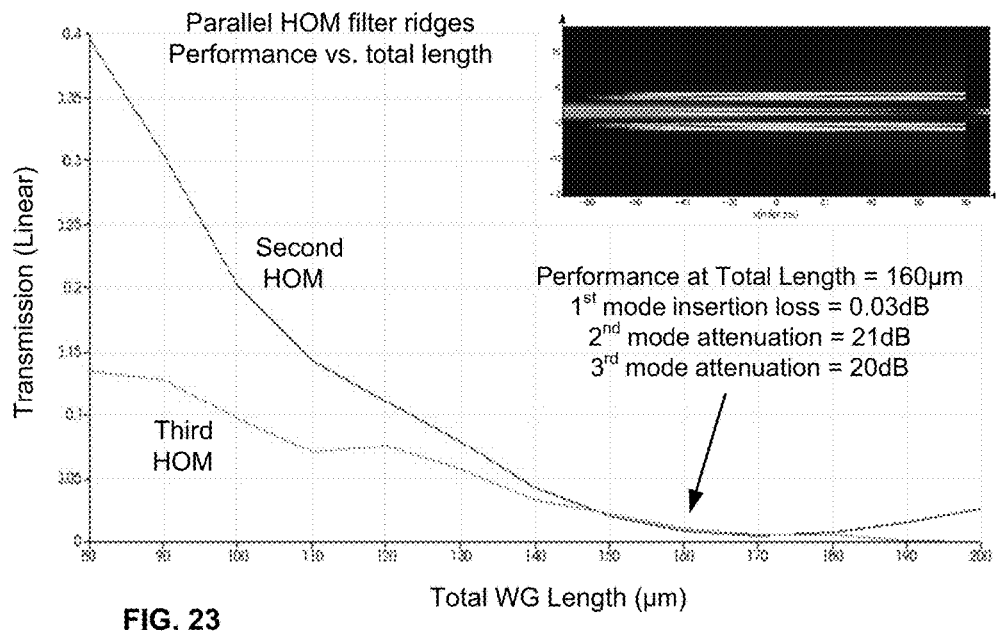
FIG. 23 shows a graph of transmission of second and third high order modes (HOM) for an embodiment of the optical filter of FIG. 8.
Figure 24:
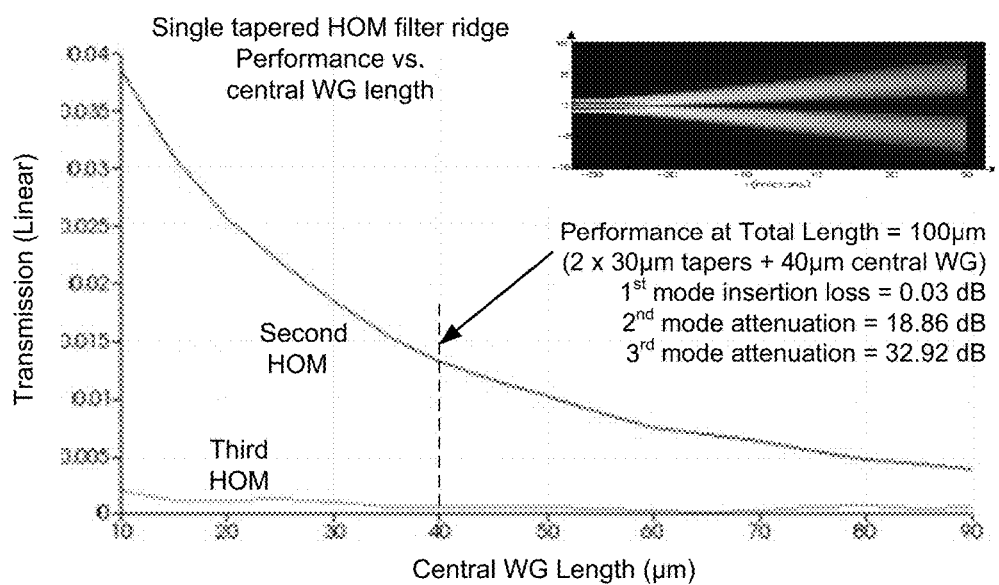
FIG. 24 shows a graph of transmission of second and third high order modes (HOM) for an embodiment of the optical filter of FIGS. 21 and 22.

FIGS. 23 and 24 compare simulated performance of certain embodiments of optical filter 2100 with certain embodiments of optical filter 100. FIG. 23 shows a graph of transmission of second and third high order modes (HOMs) for optical filter 100 as shown in FIG. 8, having center ridge 118, a first filter ridge 108-1 and a second filter ridge 108-2. Simulations were calculated and plotted for the second HOM at various total lengths of this embodiment of optical filter 100, and optical insertion loss for the fundamental mode was calculated. At a total length of 160 µm, fundamental mode insertion loss was calculated as 0.03 dB, second mode attenuation was calculated as about 21 dB and third mode attenuation was calculated as about 20 dB. A top view of a calculated intensity plot of the second HOM is also shown.

FIG. 24 shows a graph of transmission of second and third HOMs for optical filter 2100 as shown in FIGS. 21 and 22, with center ridge 2110 tapering adiabatically along 30 µm taper regions 2160-1, 2160-2 down to a 40 µm long central region 2170. Simulations were calculated and plotted for second and third HOMs at various total lengths this embodiment of optical filter 2100, and optical insertion loss for the fundamental mode was calculated. At a total length of 100 µm, fundamental mode insertion loss was calculated as 0.03 dB, second mode attenuation was calculated as 18.86 dB and third mode attenuation was calculated as 32.92 dB. While the second mode is not as greatly attenuated in this embodiment of optical filter 2100 as compared with the embodiment of optical filter 100 simulated in FIG. 23, the difference is not significant, while the length reduction is of great value in terms of yield per wafer. A top view of a calculated intensity plot of the second and third HOMs is also shown.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and practical applications to thereby enable others skilled in the art to best utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a," "an," or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. An optical filter for attenuating higher-order transverse modes, the optical filter comprising:
   a shoulder slab, wherein:
      the shoulder slab is formed of a first material having a first index of refraction and is disposed atop a second material having a second index of refraction, the first index of refraction being higher than the second index of refraction; and
   a waveguide ridge disposed atop the shoulder slab, wherein:
      the waveguide ridge is formed of the first material;
      the waveguide ridge forms an input width in a first waveguide section along a direction of beam propagation, wherein:
         a first filter section, formed by the shoulder slab and the waveguide ridge in the first waveguide section, is capable of guiding light of a fundamental mode and the higher-order transverse modes along the direction of beam propagation; and
      the waveguide ridge tapers adiabatically inward from the input width to a reduced width, in a second waveguide section that adjoins the first waveguide section along the direction of beam propagation, wherein:
         a second filter section, formed by the shoulder slab and the tapering waveguide ridge in the second waveguide section, is capable of guiding the fundamental mode, wherein the higher-order transverse modes are pushed into the shoulder slab where they are less strongly guided than the fundamental mode,
         such that a proportion of energy guided in the fundamental mode, to energy guided in the higher-order transverse modes, increases along the direction of beam propagation in the second filter section.

2. The optical filter of claim 1, wherein:
the waveguide ridge remains constant in width at the reduced width, in a third filter section that adjoins the second filter section, along the direction of beam propagation.

3. The optical filter of claim 2, wherein:
the waveguide ridge tapers adiabatically outward from the reduced width to an output width, in a fourth filter section that adjoins the third filter section along the direction of beam propagation.

4. The optical filter of claim 1, wherein the direction of beam propagation defined by the waveguide ridge is a straight line at least through the first filter section and the second filter section.

5. The optical filter of claim 1, wherein a combined height of the shoulder slab and the waveguide ridge is greater than 0.5 μm and less than 2.0 μm.

6. The optical filter of claim 1, wherein the first material is crystalline silicon.

7. The optical filter claim 1, wherein a combined length of the first and second filter sections is less than or equal to 100 microns.

8. The optical filter of claim 1, further comprising:
an input waveguide, comprising an input shoulder slab and an input waveguide ridge, the input waveguide being optically coupled with the first filter section along the direction of beam propagation; and
an output waveguide, comprising an output shoulder slab and an output waveguide ridge, the output waveguide being optically coupled with the second filter section along the direction of beam propagation.

9. The optical filter of claim 8, wherein the shoulder slab of the optical filter is at least twice as wide, transverse to the direction of beam propagation, as the shoulder slab of the input waveguide.

10. The optical filter of claim 9, wherein the shoulder slab of the optical filter forms beveled corners.

11. The optical filter of claim 1, wherein the optical filter is symmetric along an axis running along the direction of beam propagation.

12. The optical filter of claim 1, further comprising:
reflectors that are operably coupled by waveguides to form an optical cavity, and
a light source that generates the light of the fundamental mode and the higher-order transverse modes, wherein:
the light source is operably coupled within the optical cavity to form a laser, and
the optical filter is operably coupled within the optical cavity such that the optical filter reduces the higher-order transverse modes in an output of the laser.

13. A method for filtering higher-order transverse modes in a ridge waveguide, the method comprising:
transmitting a beam of light, comprising a fundamental mode and one or more higher-order transverse modes, along a direction of beam propagation in a first ridge waveguide, wherein the first ridge waveguide includes:
a waveguide shoulder slab, formed of a first material disposed atop a substrate material, the first material having a higher index of refraction than the substrate material, and
a waveguide ridge, formed of the first material, disposed atop the waveguide shoulder slab and having an input waveguide ridge width, wherein a combination of the waveguide ridge and the waveguide shoulder slab is capable of guiding the fundamental mode and the one or more higher-order transverse modes;
coupling the beam of light along the direction of beam propagation into an optical filter, wherein the optical filter comprises:
a filter shoulder slab, formed of the first material and disposed atop the substrate material, and
a filter ridge, formed of the first material, disposed atop the filter shoulder slab and having a filter ridge width, wherein:
the filter ridge width matches the input waveguide ridge width where the beam of light couples from the first ridge waveguide into the optical filter, and
the filter ridge width decreases by adiabatically tapering along the direction of beam propagation such that the fundamental mode continues to be guided by the filter ridge, while at least a portion of the one or more higher-order transverse modes are pushed into the filter shoulder slab, attenuating the one or more higher-order transverse modes in the filter ridge; and
coupling the fundamental mode into a second ridge waveguide, after the fundamental mode has passed through the optical filter and the one or more higher-order transverse modes are attenuated in the filter ridge.

14. The method for filtering higher-order transverse modes of claim 13, wherein during the steps of transmitting the beam of light along the direction of beam propagation in the first ridge waveguide, coupling the beam of light along the direction of beam propagation into the optical filter, and coupling the light of the fundamental mode into the second ridge waveguide, the direction of beam propagation remains a straight line from the first ridge waveguide, through the optical filter and into the second ridge waveguide.

15. The method for filtering higher-order transverse modes of claim 13, wherein:
the filter ridge is a first filter ridge portion, and the filter ridge width is a first filter ridge width; and
coupling the beam of light along the direction of beam propagation into the optical filter comprises coupling the beam of light into a second filter ridge portion that has a constant second filter ridge width, the second filter ridge width matching the first filter ridge width after the first filter ridge width decreases by adiabatically tapering along the direction of beam propagation.

16. The method for filtering higher-order transverse modes of claim 15, further comprising coupling the beam of light along the direction of beam propagation from the second filter ridge portion into a third filter ridge portion that has a third filter ridge width, wherein:
the third filter ridge width increases by adiabatically tapering along the direction of beam propagation;
coupling the fundamental mode into the second ridge waveguide comprises coupling the fundamental mode from the third filter ridge portion into the second ridge waveguide; and
where the beam of light couples from the third filter ridge portion into the second ridge waveguide, the third filter ridge width matches a ridge width of the second ridge waveguide.

17. The method for filtering higher-order transverse modes of claim 13, wherein:
the waveguide shoulder slab has a waveguide shoulder slab width;
the filter shoulder slab has a filter shoulder slab width that is at least twice the waveguide shoulder slab width; and
coupling the beam of light along the direction of beam propagation into the optical filter comprises diffracting the higher-order transverse modes away from the direction of beam propagation.

18. The method for filtering higher-order transverse modes of claim 13, further comprising:
providing reflectors that are operably coupled through at least the first ridge waveguide and the second ridge waveguide to form an optical cavity therebetween;

operably coupling a source of light that generates the fundamental mode and the one or more higher-order transverse modes within the optical cavity so as to form a laser; and operably coupling the optical filter within the optical cavity such that the optical filter reduces the higher-order transverse modes in an output of the laser.

19. An optical filter for reducing higher-order transverse modes in an output of a semiconductor laser, the optical filter comprising:

a shoulder slab, wherein:
  the shoulder slab is formed of a first material having a first index of refraction and is disposed atop a second material having a second index of refraction, the first index of refraction being higher than the second index of refraction; and a waveguide ridge disposed atop the shoulder slab, wherein:
  the waveguide ridge is formed of the first material;
  the waveguide ridge forms an input width in a first waveguide section along a direction of beam propagation, wherein:
    a first filter section, formed by the shoulder slab and the waveguide ridge in the first waveguide section, is capable of guiding light of a fundamental mode and the higher-order transverse modes along the direction of beam propagation; and
  the waveguide ridge tapers adiabatically inward from the input width to a reduced width, in a second waveguide section that adjoins the first waveguide section along the direction of beam propagation, wherein:
    a second filter section, formed by the shoulder slab and the tapering waveguide ridge in the second waveguide section, is capable of guiding the fundamental mode, wherein the higher-order transverse modes are pushed into the shoulder slab where they are less strongly guided than the fundamental mode, and wherein the optical filter is operably coupled within an optical cavity of the semiconductor laser, and increases a proportion of energy in the fundamental mode, to energy in the higher-order transverse modes, in the output of the laser.

* * * * *